US012789183B2

(12) United States Patent
Libsch et al.

(10) Patent No.: US 12,789,183 B2
(45) Date of Patent: Nov. 10, 2026

(54) LINEAR MICROFLUIDIC DEVICE

(71) Applicant: International Business Machines Corporation, Armonk, NY (US)

(72) Inventors: Frank Robert Libsch, White Plains, NY (US); Venkat K. Balagurusamy, Airmont, NY (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 18/216,292

(22) Filed: Jun. 29, 2023

(65) Prior Publication Data

US 2025/0001412 A1 Jan. 2, 2025

(51) Int. Cl.
*B01L 3/00* (2006.01)
*G01N 27/22* (2006.01)

(52) U.S. Cl.
CPC ...... *B01L 3/502715* (2013.01); *G01N 27/221* (2013.01); *B01L 2300/0645* (2013.01); *B01L 2300/0816* (2013.01); *B01L 2300/0877* (2013.01)

(58) Field of Classification Search
CPC ....... B01L 3/502715; B01L 2300/0645; B01L 2300/0816; B01L 2300/0877; B01L 2200/0668; B01L 2300/1827; B01L 3/502761; G01N 27/221
USPC .................................................. 422/503, 500
See application file for complete search history.

(56) References Cited

U.S. PATENT DOCUMENTS

| | | | |
|---|---|---|---|
| 9,149,806 B2 | 10/2015 | Collins | |
| 11,059,043 B2 | 7/2021 | Wang et al. | |
| 12,270,777 B2 * | 4/2025 | Libsch | G01N 27/221 |
| 2007/0238112 A1 | 10/2007 | Sohn et al. | |
| 2016/0334323 A1 * | 11/2016 | Mcguinness | G01N 27/06 |
| 2019/0329255 A1 * | 10/2019 | Edwards | B01L 3/502753 |
| 2020/0086320 A1 | 3/2020 | Lee et al. | |
| 2021/0148805 A1 | 5/2021 | Kashanin et al. | |
| 2022/0072539 A1 | 3/2022 | Montgomery et al. | |

FOREIGN PATENT DOCUMENTS

| | | |
|---|---|---|
| CN | 203337513 U | 12/2013 |
| CN | 104941704 B | 11/2016 |
| CN | 216082779 U | 3/2022 |
| WO | 2012162779 A1 | 12/2012 |

* cited by examiner

*Primary Examiner* — Christine T Mui
(74) *Attorney, Agent, or Firm* — Scully, Scott, Murphy & Presser, P.C.; Samuel Waldbaum

(57) ABSTRACT

A linear microfluidic device for sensing of one or more substances of interest is provided. The linear microfluidic device has a linear microfluidic channel that includes at least one microfluidic sensing cell located along the linear microfluidic channel. The at least one microfluidic sensing cell includes an upper electrode portion that is vertically spaced apart from a lower electrode portion, and each of the upper electrode portion and the lower electrode portion includes at least one electrically isolated probe electrode.

16 Claims, 13 Drawing Sheets

LINEAR MICROFLUIDIC DEVICE

BACKGROUND

The present application relates to a microfluidic device, and more particularly to a microfluidic device having at least one microfluidic sensing cell located along a linear microfluidic channel, and methods of using the same.

Single cells represent a fundamental biological unit. Unfortunately, the majority of biological knowledge has been obtained by the study of larger cell populations due to either simpler, quicker, less costly instrumentation and/or sample preparation. However, there are fundamental and applied questions, such as those relating to transcriptional control of stem cell differentiation, intrinsic noise in gene expression, and the origins of disease that can only be addressed at the single cell level.

Existing methods for measuring transcript levels in single cells include RT-qPCR, single molecule counting using digital PCR, hydridization probes, and next generation sequencing. Of these, single cell RT-qPCR provides combined advantages of sensitivity, specificity, and dynamic range, but a major disadvantage is the low throughput, high reagent cost, and difficulties in accurately measuring low abundance transcripts. RT-qPCR is a reverse-transcription based DNA amplification method where a transcriptase enzyme makes the complementary-DNA (cDNA) of the RNA and the cDNA is amplified by the polymerase chain reaction (PCR). This method is very useful in quantitative analysis of viral RNA and gene expression in cells.

SUMMARY

A linear microfluidic device for sensing, e.g., reactance or capacitance sensing, of one or more substances of interest (i.e., one or more particles or substances in the analyte) is provided. The linear microfluidic device of the present application has a linear microfluidic channel that includes at least one microfluidic sensing cell located along the linear microfluidic channel. The microfluidic sensing cell includes an upper electrode portion that is vertically spaced apart from a lower electrode portion, and each of the upper electrode portion and the lower electrode portion includes at least one electrically isolated probe electrode.

In one aspect of the present application, a linear microfluidic device is provided. In one embodiment, the linear microfluidic device includes a first microfluidic channel extending linearly in a first direction and positioned between a first substrate and a second substrate. The linear microfluidic device further includes at least one microfluidic sensing cell positioned along the first microfluidic channel. The microfluidic sensing cell includes an upper electrode portion including a first group of at least one upper electrically isolated probe electrode and a lower electrode portion including a second group of at least one lower electrically isolated probe electrode. In the present application, at least one upper electrically isolated probe electrode of the first group has a vertical portion that extends entirely through the first substrate and at least one lower electrically isolated probe electrode of the second group has a vertical portion that extends entirely through the second substrate.

In some embodiments, the linear microfluidic device of the present application includes multiple spaced apart microfluidic channels, each of which extends in the same direction. Notably, and in such embodiments, the linear microfluidic device further includes at least one other microfluidic channel located adjacent to and spaced apart from the first microfluidic channel, wherein the at least one other microfluidic channel extends linearly in the first direction and is positioned between the first substrate and the second substrate. In embodiments, at least one other microfluidic channel includes a second microfluidic channel, a third microfluidic channel, a fourth microfluidic channel, . . . , etc. In such embodiments, at least one other microfluidic sensing cell is positioned along at least one other microfluidic channel. At least one other microfluidic sensing cell includes an upper electrode portion including another first group of the at least one upper electrically isolated probe electrode and a lower electrode portion including another second group of at least one lower electrically isolated probe electrode. The at least one upper electrically isolated probe electrode of another first group has a vertical portion that extends entirely through the first substrate and at least one lower electrically isolated probe electrode of the another second group has a vertical portion that extends entirely through the second substrate.

In another aspect of the present application, a method of detecting the presence/absence of biological cells is provided. In one embodiment, the method includes providing a linear microfluidic device including a first microfluidic channel extending linearly in a first direction and positioned between a first substrate and a second substrate, and at least one microfluidic sensing cell positioned along the first microfluidic channel, the at least one microfluidic sensing cell includes an upper electrode portion including a first group of at least one upper electrically isolated probe electrode and a lower electrode portion including a second group of at least one lower electrically isolated probe electrode, wherein the at least one upper electrically isolated probe electrode of the first group has a vertical portion that extends entirely through the first substrate and the at least one lower electrically isolated probe electrode of the second group has a vertical portion that extends entirely through the second substrate. Next, a reactance or a capacitance of a first sample (i.e., liquid, gas, emulsion, or gel) not containing a biological cell is measured across each pair of upper electrically isolated probe electrodes of the first group and lower electrically isolated probe electrode of the second group. A second sample (i.e., same liquid, gas, emulsion, or gel) containing a biological cell is then introduced into the microfluidic channel and the reactance or capacitance of the second sample containing the biological cell is continuously measured across each pair of upper electrically isolated probe electrodes of the first group and lower electrically isolated probe electrode of the second group.

In yet another aspect of the present application, a method of detecting biological cell type is provided. In one embodiment, the method includes providing a linear microfluidic device including a first microfluidic channel extending linearly in a first direction and positioned between a first substrate and a second substrate, and at least one microfluidic sensing cell positioned along the first microfluidic channel, the at least one microfluidic sensing cell includes an upper electrode portion including a first group of at least one upper electrically isolated probe electrode and a lower electrode portion including a second group of at least one lower electrically isolated probe electrode, wherein the at least one upper electrically isolated probe electrode of the first group has a vertical portion that extends entirely through the first substrate and the at least one lower electrically isolated probe electrode of the second group has a vertical portion that extends entirely through the second substrate. Next, a reactance or a capacitance of a first sample (i.e., liquid, gas, emulsion, or gel) not containing a biological cell is measured across each pair of upper electrically isolated probe electrodes of the first group and lower electrically isolated probe electrode of the second group and over a selected frequency range to determine a dielectric constant of the first sample not containing the biological cell over the selected frequency range. A second sample (i.e., same liquid, gas, emulsion, or gel) containing a biological cell is then introduced into the microfluidic channel and the reactance or capacitance of the second sample containing the biological cell is continuously measured across each pair of upper electrically isolated probe electrodes of the first group and lower electrically isolated probe electrode of the second group and over the selected frequency range to determine a dielectric constant of the second sample containing the biological cell.

DETAILED DESCRIPTION

Figure 1B:
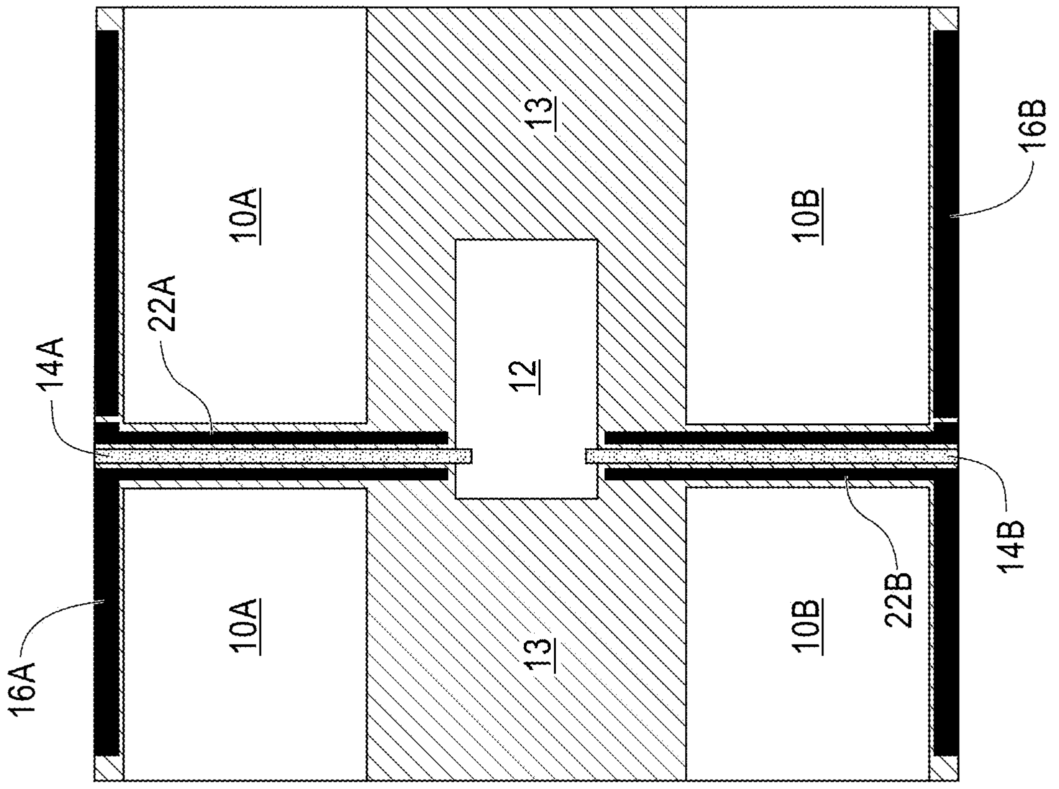
FIG. 1B is a cross sectional view of a linear microfluidic device in accordance with another embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

As stated above, a linear microfluidic device is provided. The linear microfluidic device of the present application has a linear microfluidic channel that includes at least one microfluidic sensing cell (typically a plurality of such cells is present) located along the linear microfluidic channel. The at least one microfluidic sensing cell includes an upper electrode portion that is vertically spaced apart from a lower electrode portion, and each of the upper electrode portion and the lower electrode portion includes at least one electrically isolated probe electrode. The isolated probe electrodes can be sensing probes electrodes alone or sensing probe electrodes in combination with reference probe electrodes.

Such a linear microfluidic device has improved accuracy since there is one path through the at least one microfluidic sensing cell. Also, each sensing cell includes multiple probe electrodes per microfluidic channel. This allows for both ionic (eliminates pervious Helmholtz error) and non-ionic biological cell detection. In some embodiments, the linear microfluidic device can be used for detecting the presence or the absence of biological cells (i.e., cell counting). In other embodiments, the linear microfluidic device can be used for detecting the type of biological cell (e.g., bacteria) that is present.

In embodiments, the linear microfluidic device can have a plurality of linearly connected single microfluidic sensing cells per microfluidic channel, and several parallel channels enabling higher throughput determined by the assay flow rate and the detector sampling speed. The accuracy increase comes from (1) having separate current or voltage stimulus probe electrodes for each microfluidic sensing cell with separate isolated imbedded detection/measurement probe electrodes within the main path of the stimulus probe electrodes, (2) having several microfluidic sensing cells in series, (3) having the option of multiple microfluidic channels, and (4) have the option of a calibration/differential sensing of a second adjacent nearly identical microfluidic channel. The linear microfluidic device of the present application eliminates previous capacitor sensor measurement issues with conducting liquids that are complicated by ionic conductivity and the effects of electrode polarization. The linear microfluidic device when using three or more probe electrodes (with at least two spaced aways from the microfluidic channel walls) overcomes electrode polarization problems by measuring the voltage drop away from the capacitive plates and thereby avoiding the double (Helmholtz) layer. Also, the linear microfluidic device of the present application can be formed by a wafer-to-wafer parallel fabrication manufacturing method that results in substantially lower fabrication cost. Furthermore, the linear microfluidic device can be used for measurements including for example, cell counting and cell sorting with disclosed structure. These and other aspects of the present application will now be described in greater detail.

Figure 1A:
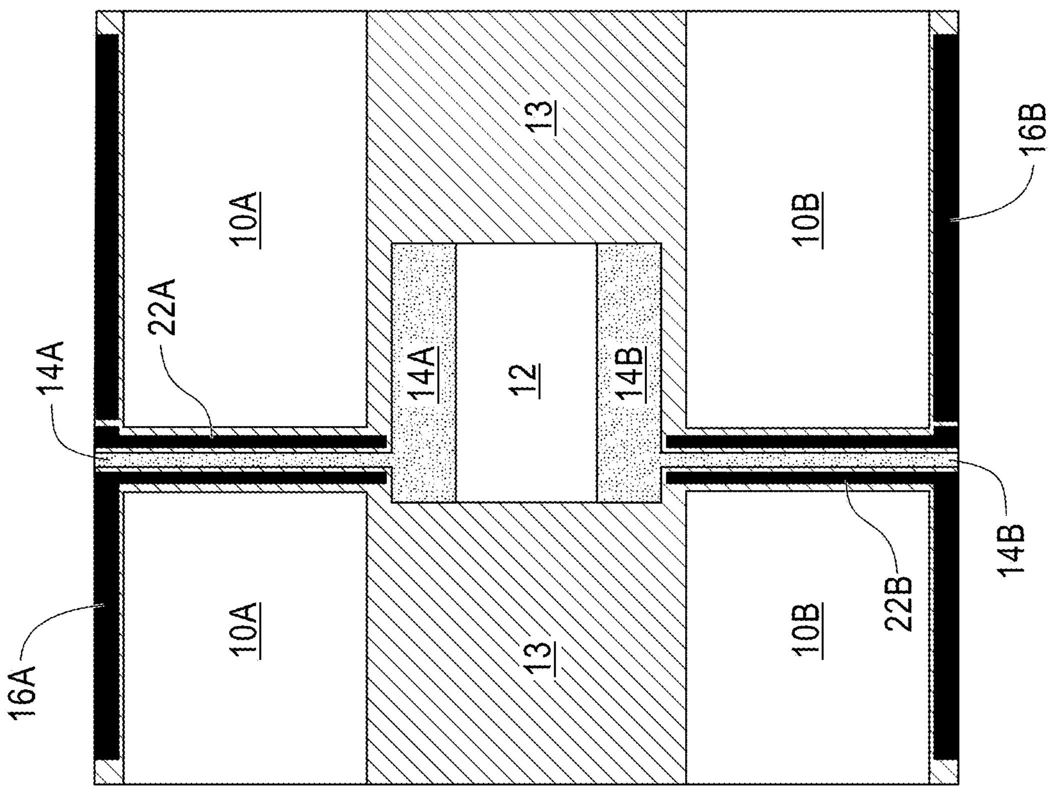
FIG. 1A is a cross sectional view of a linear microfluidic device in accordance with an embodiment of the present application.

Reference is first made to FIGS. 1A and 1B which illustrates a linear microfluidic device in accordance with embodiments of the present application. In some embodiments, the devices shown in FIGS. 1A and 1B can be combined into a single linear microfluidic device in which the two microfluidic channels run parallel to each other. In some embodiments, the devices shown in FIGS. 1A and 1B can be combined into a single linear microfluidic device in which the two pair of probes run in the same microfluidic channel. Notably, FIGS. 1A and 1B include a first microfluidic channel 12 extending linearly in a first direction and positioned between a first substrate 10A and a second substrate 10B. The linear microfluidic devices further include at least one microfluidic sensing cell (only one is shown in each cross-sectional view) positioned along the first microfluidic channel 12. The at least one microfluidic sensing cell includes an upper electrode portion including a first group of at least one upper electrically isolated probe electrode 14A and a lower electrode portion including a second group of at least one lower electrically isolated probe electrode 14B. In the present application, the at least one upper electrically isolated probe electrode 14A of the first group has a vertical portion that extends entirely through the first substrate 10A and the at least one lower electrically isolated probe electrode 14B of the second group has a vertical portion that extends entirely through the second substrate 10B.

The first microfluidic channel 12 (or any other microfluidic channels that runs parallel to the first microfluidic channel) is a cavity or chamber that exists between the first substrate 10A and the second substrate 10B. In the present application, a gas or liquid (i.e., sample) containing one or more substances (or analytes as defined herein below) of interest can flow through the first microfluidic channel 12 and be sensed by the upper electrically isolated probe electrode 14A and the lower electrically isolated probe electrodes 14B that are associated with the at least one microfluidic sensing cell. In some embodiments, the upper electrically isolated probe electrode 14A and the lower electrically isolated probe electrodes 14B are configured for capacitance sensing.

The first substrate 10A can be composed of a first substrate material, and the second substrate 10B can be composed of a second substrate material. In some embodiments of the present application, the first substrate material that provides the first substrate 10A is compositionally the same as the second substrate material that provides the second substrate 10B. In other embodiments, the first substrate material that provides the first substrate 10A is compositionally different from the second substrate material that provides the second substrate 10B. Exemplary first substrate materials and second substrate materials that can be employed in the present application include, but are not limited to, a semiconductor material, an electrically insulating material, a combination of a semiconductor material and an electrically insulating material.

The term "semiconductor material" is used throughout the present application to denote a material that has semiconducting properties. Examples of semiconductor materials that can be used as the first substrate material and the second substrate mater include, but are not limited to, silicon (Si), a silicon germanium (SiGe) alloy, a silicon germanium carbide (SiGeC) alloy, germanium (Ge), III/V compound semiconductors or II/VI compound semiconductors. Other examples of substrate material may involve glass, ceramic or organic printed circuit boards. In one example, the first substrate material and the second substrate material are both composed entirely of silicon.

Exemplary electrically insulating materials that can be employed as the first substrate material and the second substrate material include, but are not limited to, glass or a polymer. Exemplary polymers that can be employed in the present application include, but are not limited to, poly (ethylene terephthalate) (PET), poly(butylene terephthalate) (PBT), poly(ethylene naphthalate) (PEN), polycarbonate (PC), polyimides (PI), polysulfones (PSO), and poly(p-phenylene ether sulfone) (PES).

In some embodiments, the first substrate 10A and the second substrate 10B are both transparent. Transparent substrates provide for a visual inspection and/or analysis of the one or more substances that pass through the first microfluidic channel 12. In other embodiments, in which the first substrate 10A or the second substrate 10B represents the top substrate, the top substrate is transparent, and the bottom substrate can be transparent or non-transparent. Exemplary transparent substrate materials include glass and/or the polymers mentioned above. Semiconductor materials are exemplary non-transparent substrate materials.

The first microfluidic channel 12 can be laterally surrounded by a spacing element 13. When multiple microfluidic channels are present each microfluidic channel runs parallel to each other and is spaced apart by spacing element 13. Spacing element 13 not only controls the spacing between the first substrate 10A and the second substrate 10B, but determines the height, h, of the first microfluidic channel 12. In some embodiments of the present application, the spacing element 13 is a dielectric material such as, for example, silicon dioxide, silicon nitride, silicon nitride and/or a low dielectric constant (k) material, the term "low k" denotes a dielectric material having a dielectric constant of less than 4.0 as measured under vacuum. In other embodiments of the present application, the spacing element 13 is a gasket, a spacer ball, solder or thin films deposited during fabrication, such as silicon dioxide, silicon nitride or any low K dielectric where the dielectric constant is less than 4.

In the present application, the height, h, of the first microfluidic channel 12 (and any other microfluidic channel) is typically from 1 micron to 1 centimeter, with a height from 1 micron to 100 microns being even more typical. In the present application, the height, h, of the first microfluidic channel 12 (and any other microfluidic channel) can be designed to a desired height dependent on what substance(s) needs to be detected. For example, a small height, h, of the first microfluidic channel 12 can be used to detect small quantities of a substance or substances in a liquid or gas that passes through the first microfluidic channel 12.

In the linear microfluidic device of the present application, the first substrate 10A includes the upper electrode portion of the microfluidic sensing cell and the second substrate includes the lower electrode portion of the microfluidic sensing cell. As stated above, the upper electrode portion includes the first group of at least one upper electrically isolated probe electrode 14A and the lower electrode portion includes the second group of at least one lower electrically isolated probe electrode 14B. In embodiments of the present application, there can be 'n' number of upper electrically isolated probe electrodes 14A in the first group and 'n' number of lower electrically isolated probe electrodes 14B in the second group, wherein n is an integer starting at one. In one embodiment, n is 1. In another embodiment, n is 2 or 3 or 4, . . . etc.

The upper electrode portion also includes at least one first ground electrode 16A, while the lower electrode portion also includes at least one second ground electrode 16B. In the present application, the first ground electrode 16A has a vertical portion that extends entirely through the first substrate 10A and the second ground electrode 16B has a vertical portion that extends entirely through the second substrate 10B. Each vertical portion is present in a through-via that is present in the first substrate 10A or in the second substrate 10B. The first ground electrode 16A and the second ground electrode 16B are electrically isolated.

In accordance with the present application, the upper electrically isolated probe electrode 14A of the first group is mated, i.e., paired, with the lower electrically isolated probe electrode 14B of the second group. Throughout the present application, the term "mated" denotes that the probe electrodes are paired and have a cooperative working relationship with each other.

In some embodiments of the present application, the upper electrically isolated probe electrode 14A of the first group is vertically aligned with the lower electrically isolated probe electrode 14B of the second group. In other embodiments, the upper electrically isolated probe electrode 14A of the first group is vertically offset, yet overlapping, the lower electrically isolated probe electrode 14B of the second group.

In some embodiments, the upper electrically isolated probe electrode 14A of the first group and the lower electrically isolated probe electrode 14B of the second are non-coaxed. In other embodiments, the upper electrically isolated probe electrode 14A of the first group is coaxed with the first ground electrode 16A and the lower electrically isolated probe electrode 14B of the second group is coaxed with the second ground electrode 16B. The coaxial embodiment adds additional electromigration shielding to the electrodes.

In embodiments, the upper electrically isolated probe electrode 14A and the lower electrically isolated probe electrode 14B as well as the first and second ground electrodes 16A, 16B have contact pads (not shown). Each corresponding contact pad and electrode combination is typically of unitary construction and is typically composed of same electrically conductive material. The contact pads can be used to electrically connect the electrodes of the first group of and electrode of the second group to external circuitry and/or external devices. In some embodiments, signal wires can be formed and use to electrically connect via the corresponding contact pad each of the electrodes of the first and second groups to external circuitry.

In some embodiments of the present application, the electrically conductive material that provides the upper electrically isolated probe electrode 14A, the lower electrically isolated probe electrode 14B, the first ground electrode 16A, the second ground electrode 16B and, if present, the contact pads, is composed of a non-transparent electrically conductive material such as, for example, copper (Cu), platinum (Pt), gold (Au), silver (Ag), nickel (Ni), tungsten (W), aluminum (Al) or alloys thereof. In other embodiments of the present application, the electrically conductive material that provides the upper electrically isolated probe electrode 14A, the lower electrically isolated probe electrode 14B, the first ground electrode 16A, the second ground electrode 16B and, if present, the contact pads, is composed of a transparent electrically conductive material such as, for example, indium tin oxide (ITO), zinc oxide, cadmium oxide, or titanium oxide.

In some embodiments of the present application, ground electrodes are composed of a compositionally same electrically conductive material as each of the probe electrodes. In other embodiments of the present application the ground electrodes are composed of a compositionally different electrically conductive material than each of the probe electrodes.

In some embodiments of the present application and as illustrated in FIG. 1B, the upper electrically isolated probe electrode 14A of the first group extends a first depth, d1, into the first microfluidic channel 12, while lower electrically isolated probe electrode 14B of the second group extends a second depth, d2, into the first microfluidic channel 12. By designing the upper electrically isolated probe electrode 14A and the lower electrically isolated probe electrode 14B to extend into the first microfluidic channel 12, the charged Helmholtz layer effect and polarization error of conducting liquids (such as, for example, DNA, proteins, etc.) can be eliminated. In some embodiments, only one of upper electrically isolated probe electrode 14A or the lower electrically isolated probe electrode 14B extends into the first microfluidic channel 12. In yet other embodiments, none of the upper electrically isolated probe electrode 14A and the lower electrically isolated probe electrode 14B extends into the first microfluidic channel 12.

In the present application, the upper electrically isolated probe electrode 14A and the lower electrically isolated probe electrode 14B can be designed to have probe head that has a greater surface area than the other probe electrodes. This flexibility allows the tradeoff of a better signal-to-noise for a give microfluidic channel 12 volume since capacitive sensing via the probes 14A and 14B is directly proportional to the probe area.

In the present application, the upper electrically isolated probe electrode 14A is encased in an upper electrically insulating layer 22A, and the second electrically isolated probe electrode 14B encased in a lower electrically insulating layer 22A; the sensing surface and the contact pad of each of the upper electrically isolated probe electrode 14A and the lower electrically isolated probe electrode 14B does not include any electrically insulator material thereon. The upper electrically insulating layer 22A and the lower electrically insulating layer 22B are composed of one or more dielectric materials such as, for example, silicon dioxide, silicon nitride, and/or a low dielectric constant (low k) material such as organosilicate glass. The dielectric material (s) that provides the upper electrically conductive insulating layer 22A can be compositionally the same as, or different from, the dielectric material that provides the lower electrically insulating layer 22B.

In some embodiments (not shown in FIGS. 1A and 1B), a thermistor can be positioned on a surface of the first substrate 10A that faces the first microfluidic channel 12. In such an embodiment, the thermistor has a vertical portion that extends through the entirety of the first substrate 10A. In the present application, the term "thermistor" denotes a semiconductor type of resistor whose resistance is strongly dependent on temperature, more so than in standard resistors. Thermistors are divided based on their conduction model. Negative Temperature Coefficient (NTC) thermistors have less resistance at higher temperatures, while Positive Temperature Coefficient (PTC) thermistors have more resistance at higher temperatures. Both type of thermistors can be used in the present application. NTC thermistor are widely used as inrush current limiters, temperature sensors, while PTC thermistors are used as self-resetting overcurrent protectors, and self-heating elements. The thermistor is typically composed of a powered metal oxide. In embodiment, the thermistor can be composed of a compositionally same or compositionally different material than each of the upper probe electrodes 14A.

In some embodiments (not shown in FIGS. 1A and 1B), a resistive heating element can be positioned on a surface of the second substrate 10B that faces the first microfluidic channel 12. In such an embodiment, the resistive heating element has a vertical portion that extends through the entirety of the second substrate 10B. In the present application, both the thermistor and resistive heating element are typically present. The resistive heating element can include a metallic wire that gives off heat when electric current passes through it. The metallic wire must have enough electrical resistance to convert the electrical energy into heat, but not so high that is becomes an insulator. The resistance of the metallic wire depends in its resistivity, length and cross-sectional area. In embodiment, the resistive heating element can be composed of a compositionally same or compositionally different material than each of the lower probe electrodes 14B.

The linear microfluidic device of the present application can be formed utilizing processing techniques that are well known to those skilled in semiconductor manufacturing. In the present application, the first substrate 10A can be processed to include the first group of the at least one upper electrically isolated probe electrode 14A and the first ground electrode 16A, and the second substrate 10B can be processed to include the second group of the at least one lower electrically isolated probe electrode 14B and the second ground electrode 16A. In embodiments, the first substrate 10 can also be processed to include the thermistor and the second substrate 10B can also be processed to include the resistive heating element. The processing of the first and second substrates 10A, 10B can include forming at least two through-vias into the first and second semiconductor materials, and various metallization steps that include insulator material deposition, electrically conductive material deposition (e.g., seed layer deposition and plating), and lithography patterning. The processing can provide non-coaxial or coaxial probe electrodes. The lithography patterning includes one or more etching processes.

Spacing element 13 can then be formed on of, or both of, the processed substrates, e.g., first substrate 10A, and a bonding processing can be used to bond the two processed substrates together.

Figure 2A:
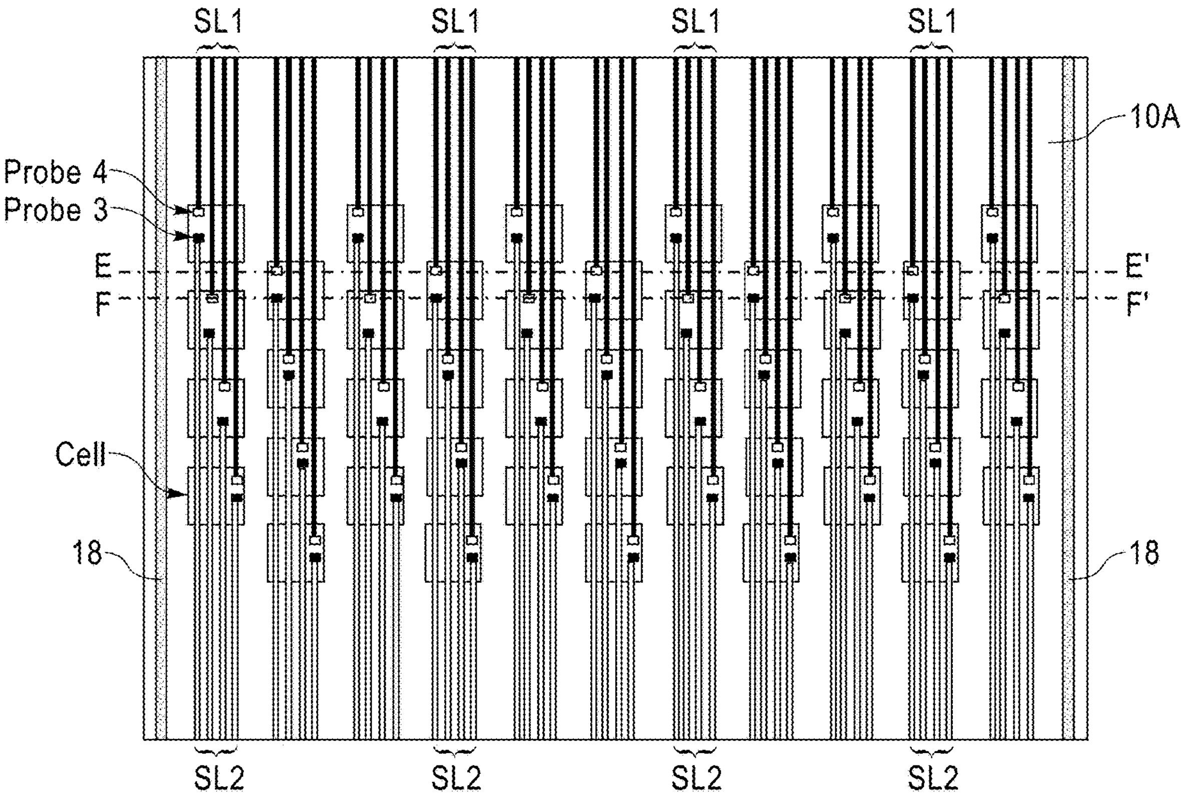
FIG. 2A is a top-down view illustrating a sensor array architecture for a first substrate containing in-line probe electrodes and a resistive heating element (the ground electrode is not shown) in accordance with an embodiment of the present application; cuts E-E' and F-F' are shown.

Referring now to FIG. 2A, there is illustrated a sensor array architecture for a first substrate 10A containing in-line probe electrodes (upper electrically isolated probe electrode 14A) and a thermistor 18 (the first ground electrode is not shown) in accordance with an embodiment of the present application; cuts E-E' and F-F' are shown. In this embodiments, two upper probe electrodes referred to herein as probe electrode 3 and probe electrode 4 are present in each cell. Probe electrode 3 and probe electrode 4 are upper electrically probe electrodes 14A, as defined above. In the illustrated embodiment, a plurality of microfluidic sensing cells is present. The microfluidic sensing cells are arranged in rows (left to right) and columns (top to bottom). The microfluidic sensing cells in a given column are in-line with each other. Within each column of cells and in the illustrated embodiment, a first group of four signal lines, SL1, is shown. Each individual signal line of the first group of signal lines, SL1, is electrically to probe electrode 4 that is present in each cell within a given column of cells. Within each column of cells, a second group of four signal lines, SL2, is shown. Each individual signal line of the second group of signal lines, SL2, is electrically to a probe electrode 3 that is present in each cell within a given column of cells. FIG. 2A includes a cut E-E' which passes (from left to right) through alternative microfluidic sensing cells and probe 4, and a cut F-F' that passes (from left to right) through each of microfluidic sensing cells alternating between probe 3 and probe 4.

Figure 2B:
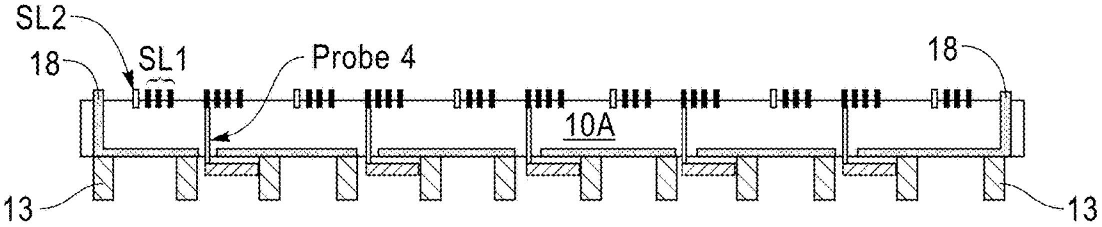
FIG. 2B is a cross sectional view though E-E' shown in FIG. 2A.

Referring now to FIG. 2B, this drawing illustrates that for every other (even column) microfluidic sensing cell (going from left to right), each probe electrode 4 accesses the microfluidic channel (not shown) via a through-via in the first substate 10A, and each probe electrode 4 is electrically connected to a first single line of the first group of signal lines, SL1.

Figure 2C:
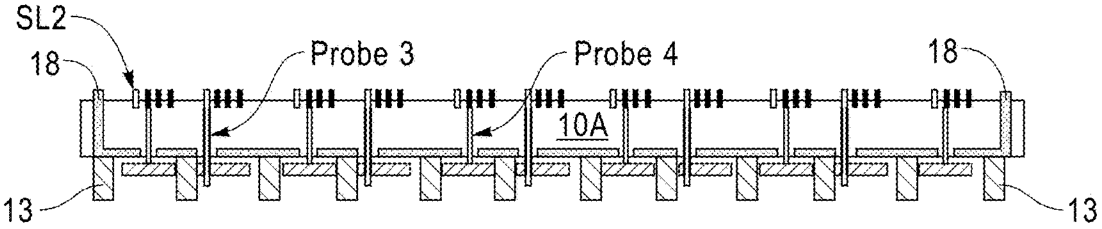
FIG. 2C is a cross sectional view though F-F' shown in FIG. 2A.

Referring now to FIG. 2C, this drawing illustrates that within every odd column of microfluidic sensing cells, probe electrode 4 accesses the microfluidic channel (not shown) via a through-via in the first substate 10A, and the each probe electrode 4 is electrically connected to a second single line of the first group of signal lines, SL1, and for every even number column of microfluidic sensing cells, probe electrode 3 accesses the microfluidic channel (not shown) via a through-via in the first substate 10A, and the each probe electrode 3 is electrically connected to a first signal line of the second group of signal lines, SL2.

Figure 3A:
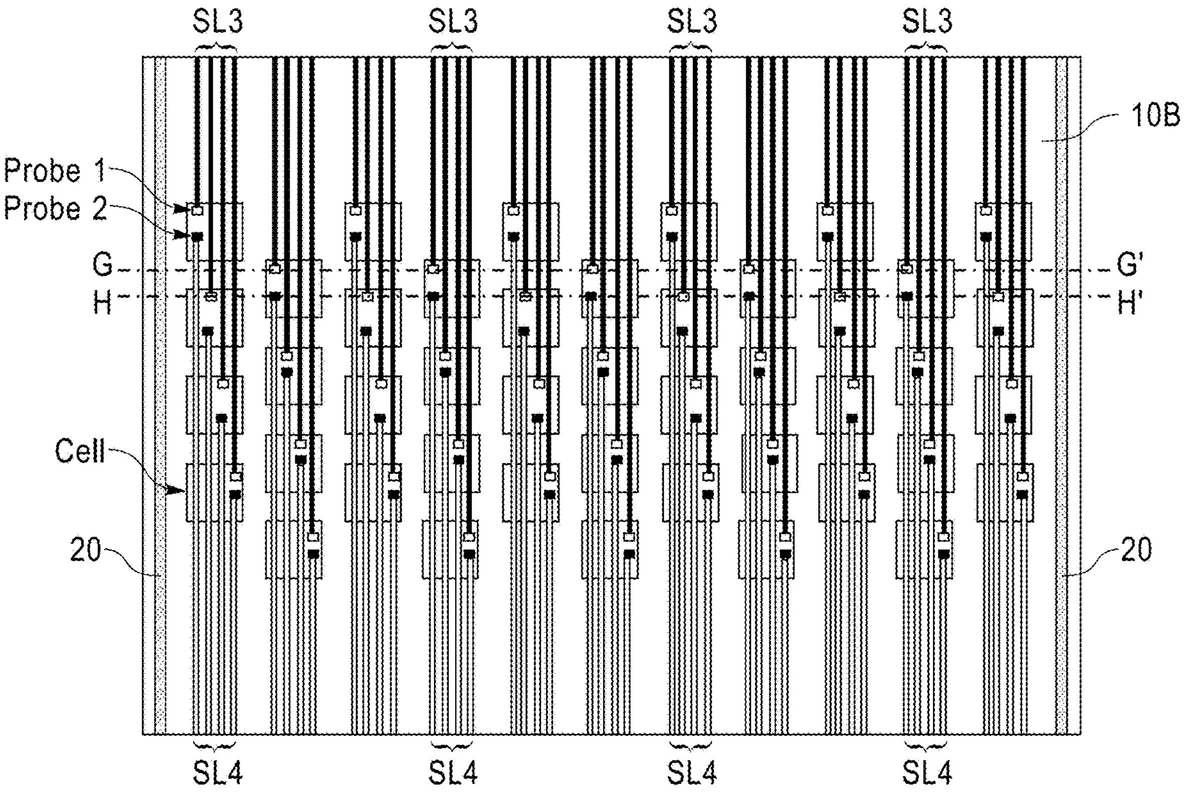
FIG. 3A is a top-down view illustrating a sensor array architecture for a second substrate containing in-line probe electrodes and a resistive heating element (the ground electrode is not shown) in accordance with an embodiment of the present application; cuts G-G' and H-H' are shown.

Referring now to FIG. 3A, there is illustrated a sensor array architecture for a second substrate 10B containing in-line probe electrodes (lower electrically isolated probe electrode 14B) and a resistive heating element 20 (the second ground electrode is not shown) in accordance with an embodiment of the present application; cuts G-G' and H-HF' are shown. In this embodiments, two lower probe electrodes referred to herein as probe electrode 1 and probe electrode 2 are present in each cell. Probe electrode 1 and probe electrode 2 are lower electrically probe electrodes 14B, as defined above. In the present application, probe electrode 4 will be paired with probe electrode 1, while probe electrode 3 will be paired with probe electrode 2. In the illustrated embodiment, a plurality of microfluidic sensing cells is present. The microfluidic sensing cells are arranged in rows (left to right) and columns (top to bottom). The microfluidic sensing cells in a given column are in-line with each other. Within each column of cells and in the illustrated embodiment, a third group of four signal lines, SL3, is shown. Each individual signal line of the third group of signal lines, SL3, is electrically to probe electrode 1 that is present in each cell within a given column of cells. Within each column of cells, a fourth group of four signal lines, SL4, is shown. Each individual signal line of the fourth group of signal lines, SL4, is electrically to a probe electrode 2 that is present in each cell within a given column of cells. FIG. 3A includes a cut G-G' which passes (from left to right) through alternative microfluidic sensing cells and a cut F-F' that passes (from left to right) through each of microfluidic sensing cells.

Figure 3B:
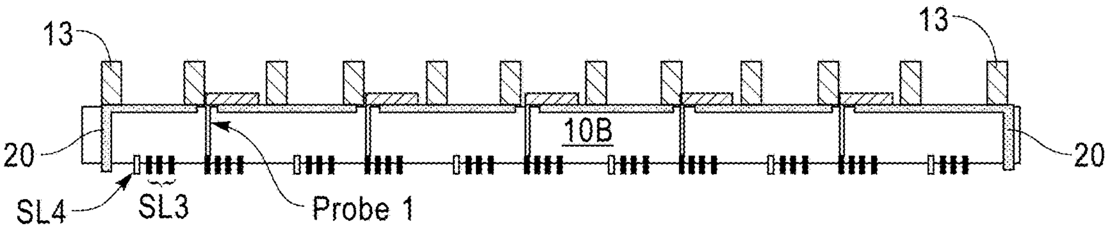
FIG. 3B is a cross sectional view though G-G' shown in FIG. 3A.

Referring now to FIG. 3B, this drawing illustrates that for every other (even column) microfluidic sensing cell (going from left to right), each probe electrode 1 accesses the microfluidic channel (not shown) via a through-via in the second substate 10BA, and each probe electrode 1 is electrically connected to a third single line of the third group of signal lines, SL3.

Figure 3C:
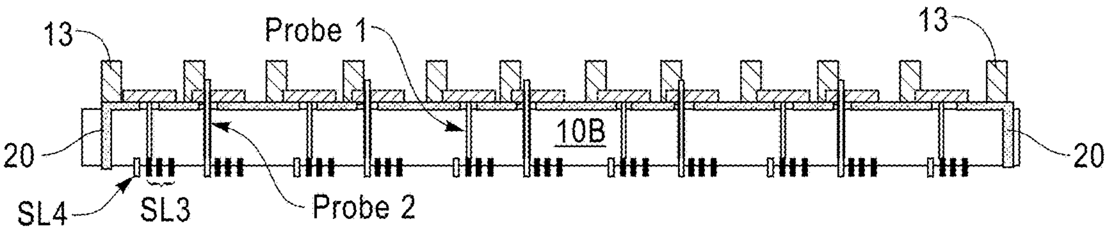
FIG. 3C is a cross sectional view though H-H' shown in FIG. 3A.

Referring now to FIG. 3C, this drawing illustrates that within every odd column of microfluidic sensing cells, probe electrode 1 accesses the microfluidic channel (not shown) via a through-via in the second substate 10BA, and the each probe electrode 1 is electrically connected to a first single line of the third group of signal lines, SL3, and for every even number column of microfluidic sensing cells, probe electrode 2 accesses the microfluidic channel (not shown) via a through-via in the second substate 10B, and the each probe electrode 2 is electrically connected to a first signal line of the fourth group of signal lines, SL4.

Figure 4A:
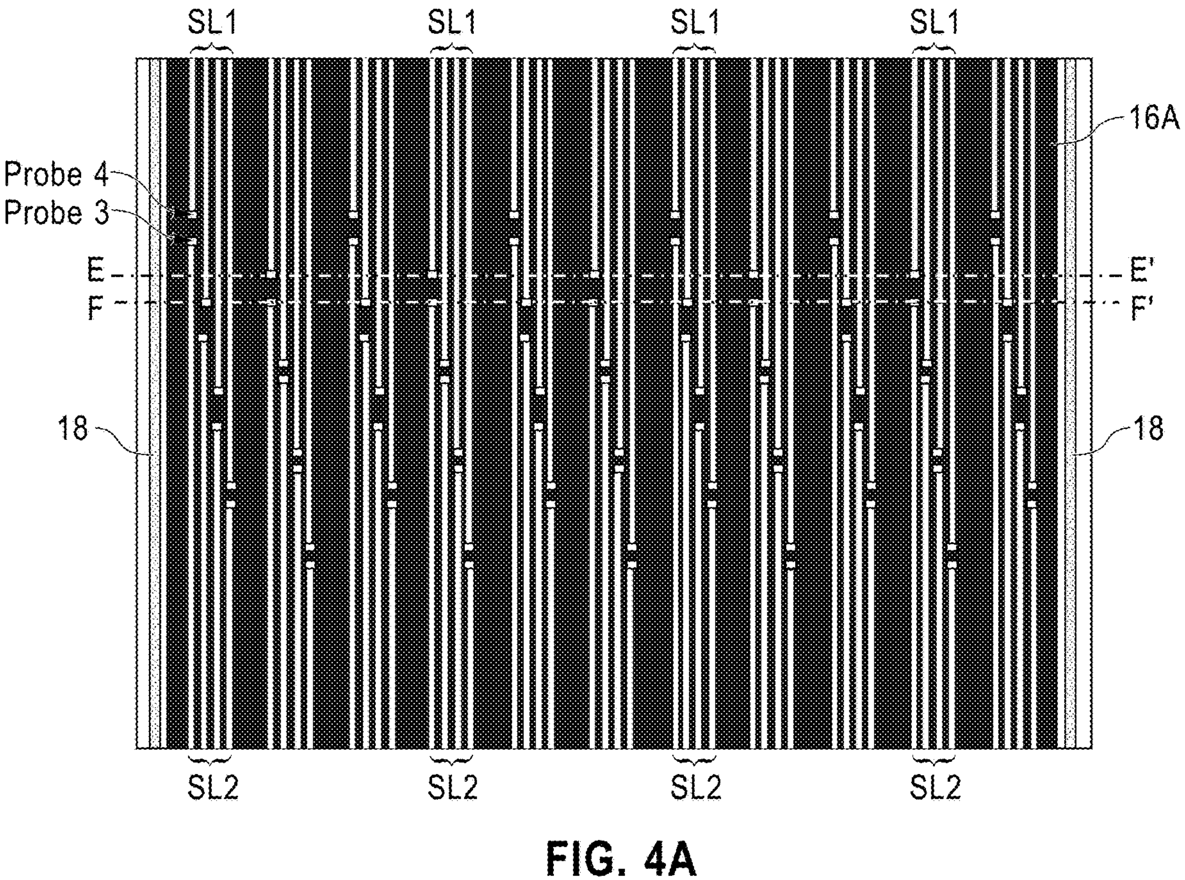
FIG. 4A is a top-down view illustrating a sensor array architecture as shown in FIG. 2A with the ground electrode.
Figure 4B:
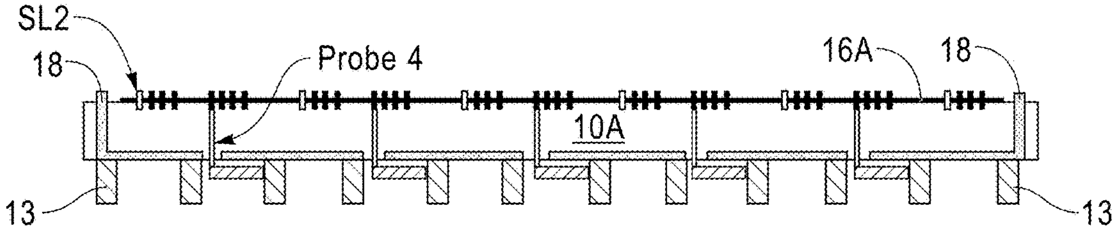
FIG. 4B is a cross sectional view though E-E' shown in FIG. 4A.
Figure 4C:
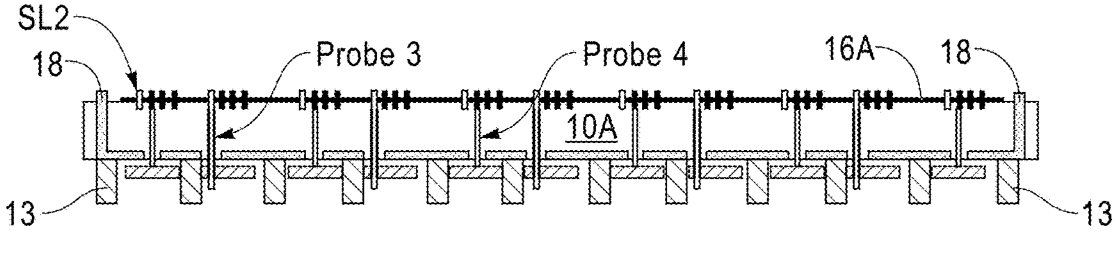
FIG. 4C is a cross sectional view though F-F' shown in FIG. 4A.

Referring now FIG. 4A is a top-down view illustrating a sensor array architecture as shown in FIG. 2A with the ground electrode (i.e., first ground electrode 16A); cuts E-E' and F-F' are shown. FIG. 4A shows the same configuration as described above with respect to FIG. 2B except that the first ground electrode 16A is shown. FIG. 4C shows the same configuration as described above with respect to FIG. 2C except that the first ground electrode 16A is shown and that the first ground electrode 16A that accesses the microfluidic channel is coaxial with each probe electrode 3 that accesses the first microfluidic channel. A similar architecture as shown in FIGS. 4A-4C would exits for the second ground electrode.

Figure 5A:
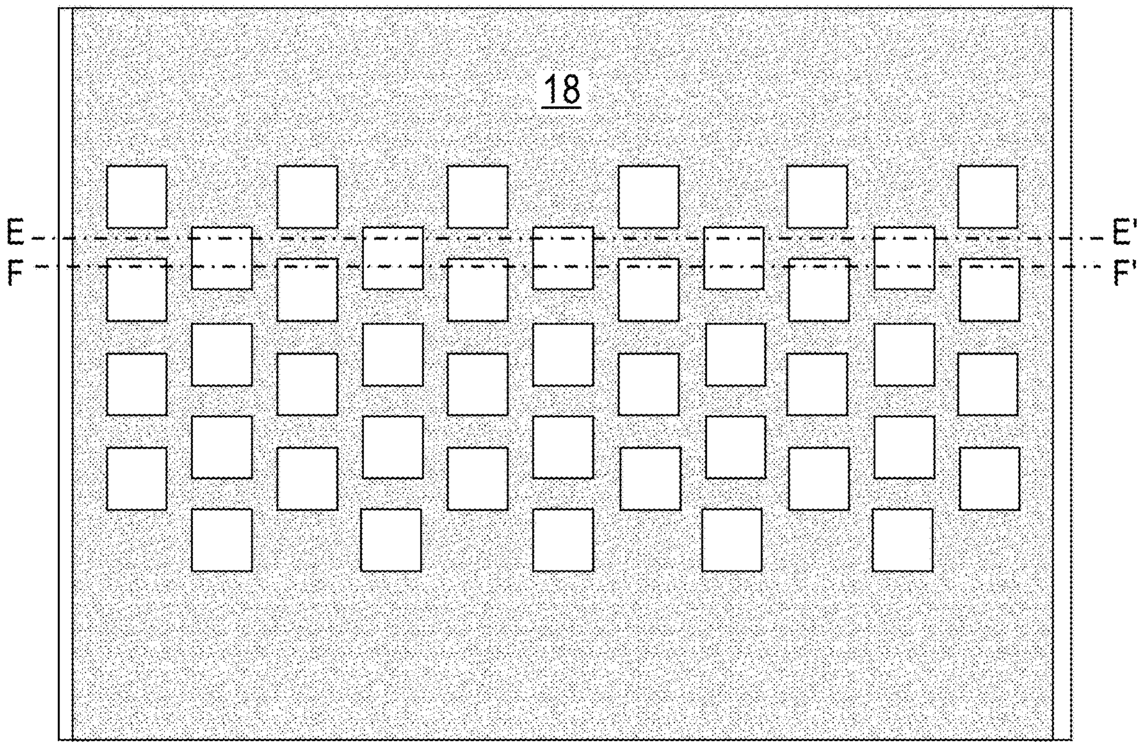
FIG. 5A is a view illustrating the bottom of the first substrate illustrated in FIG. 2A with a thermistor element, cuts E-E' and F-F' are shown.
Figure 5B:
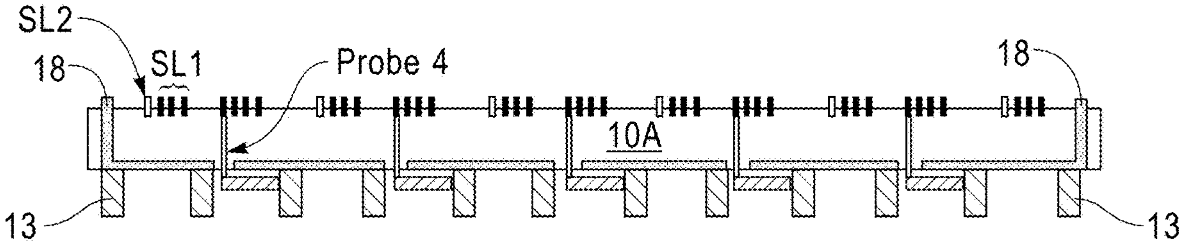
FIG. 5B is a cross sectional view though E-E' shown in FIG. 5A.
Figure 5C:
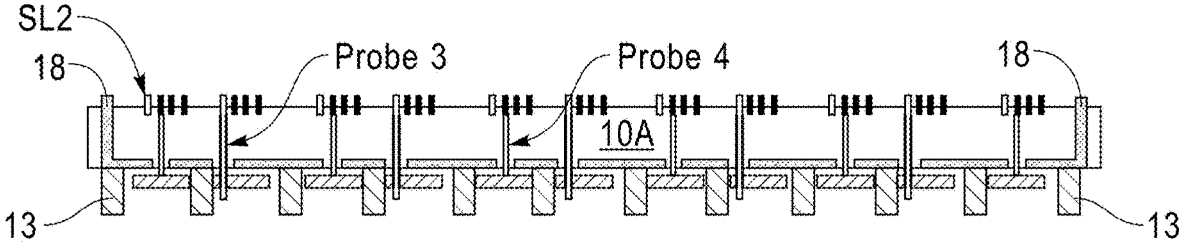
FIG. 5C is a cross sectional view though F-F' shown in FIG. 5A.

Referring now to FIG. 5A. there is illustrated the bottom of the first substrate 10A illustrated in FIG. 2A with thermistor element 18, cuts E-E' and F-F' are shown. FIG. 5B shows the pattern though E-E' shown in FIG. 5A, while FIG. 5C illustrates the pattern though F-F' shown in FIG. 5A. A similar pattern would exist for the resistive heating element 20 on a top surface of the second substrate 10B.

Figure 6A:
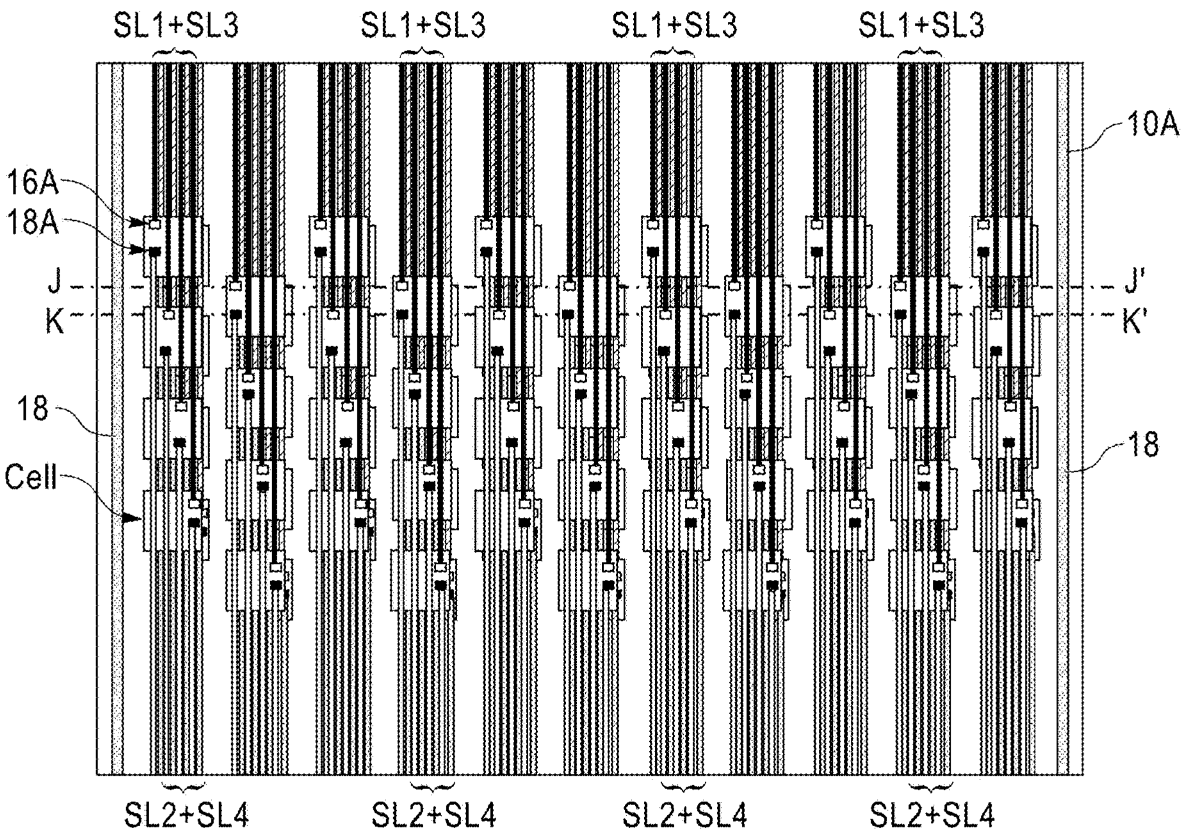
FIG. 6A is a top-down view illustrating a sensor array architecture after assembly of the first substrate and the second substrate illustrated in FIGS. 2A and 3A and showing a resistive heating element and a thermistor element, cut K-K' is shown.
Figure 6B:
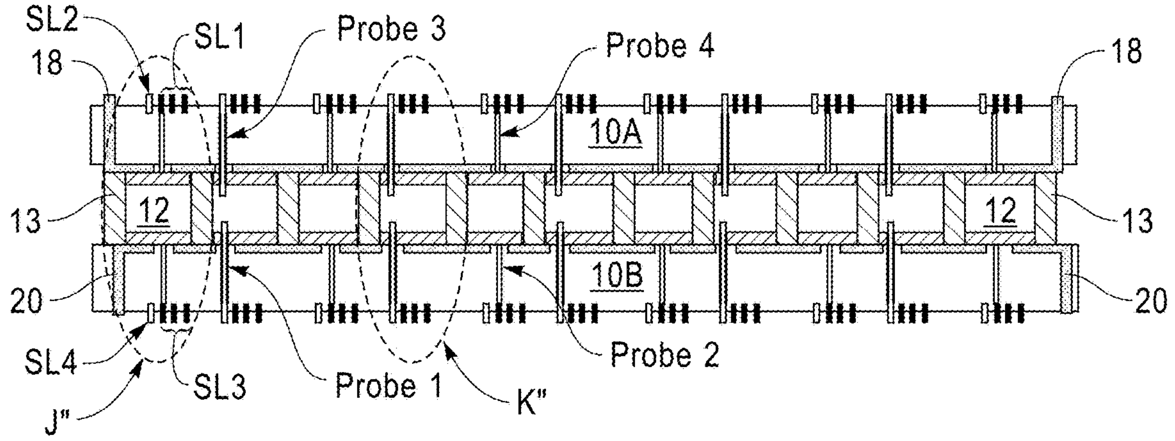
FIG. 6B is a cross sectional view though K-K' shown in FIG. 6A.

Referring now to FIG. 6A, there is illustrated a sensor array architecture after assembly of the first substrate 10A and the second substrate 10B illustrated in FIGS. 2A and 3A and showing a resistive heating element 20 and a thermistor 18, cut K-K' is shown. FIG. 6B shows the K-K' shown in FIG. 6A. In this embodiment, each microfluidic sensing cell includes four probe electrodes, probe electrodes 3 and 4 (which are upper electrically isolated probe electrodes as defined above) and probes 1 and 2 (which are lower electrically isolated probe electrodes as defined above).

Figure 7A:
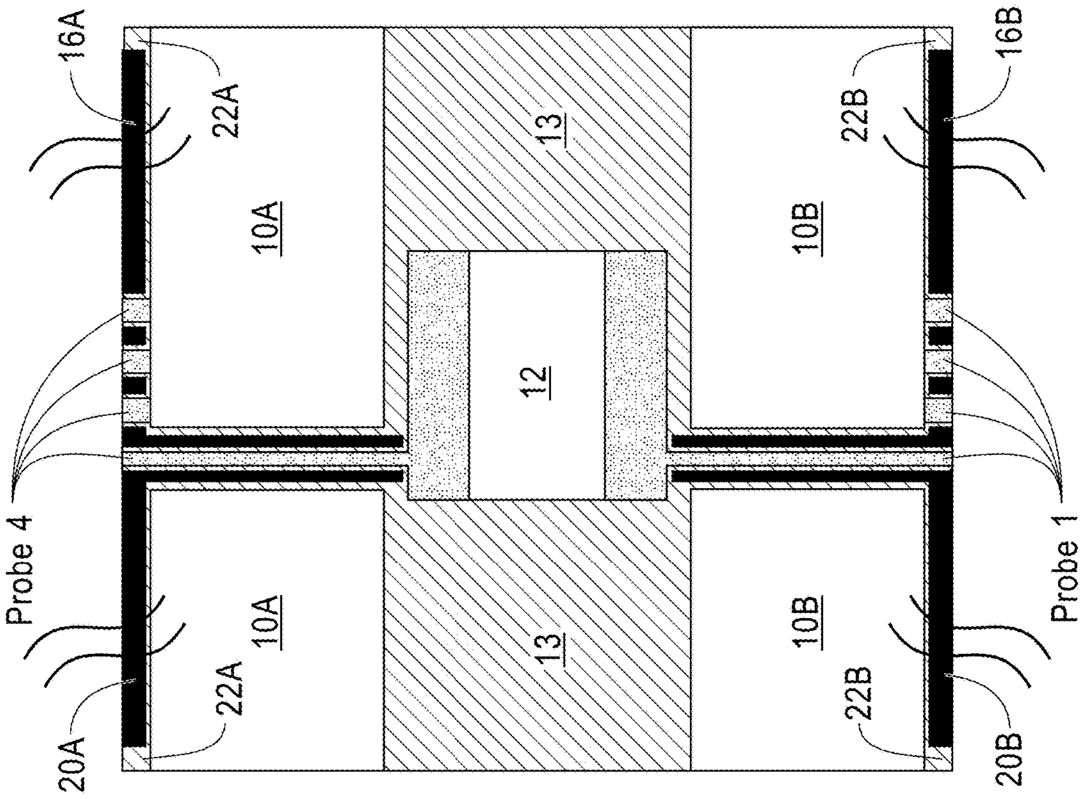
FIG. 7A is a cross sectional view of the microfluidic device through area J" shown in FIG. 6B.
Figure 7B:
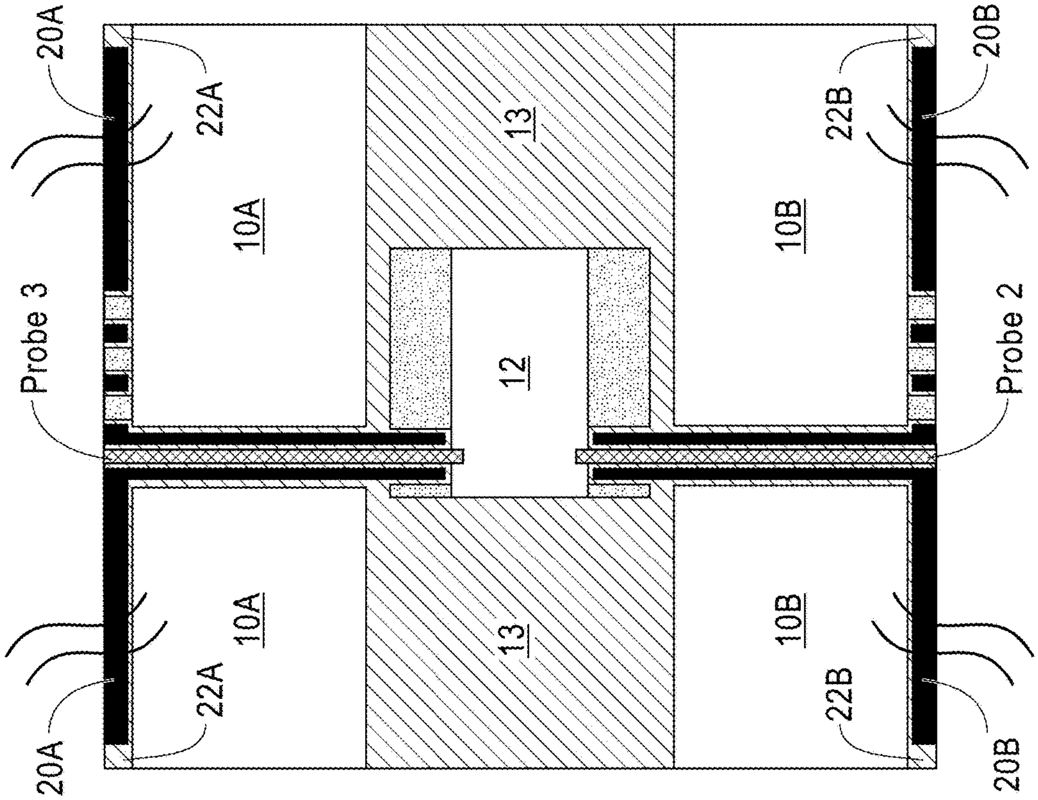
FIG. 7B is a cross sectional view of the microfluidic device through area K" shown in FIG. 6B.

Referring now to FIGS. 7A-7B, there is illustrated the microfluidic device through area J" shown in FIG. 6B and through area K" shown in FIG. 6B. In this embodiment, each microfluidic sensing cell includes four probe electrodes, probe electrodes 3 and 4 (which are upper electrically isolated probe electrodes as defined above) and probes 1 and 2 (which are lower electrically isolated probe electrodes as defined above).

Figure 8A:
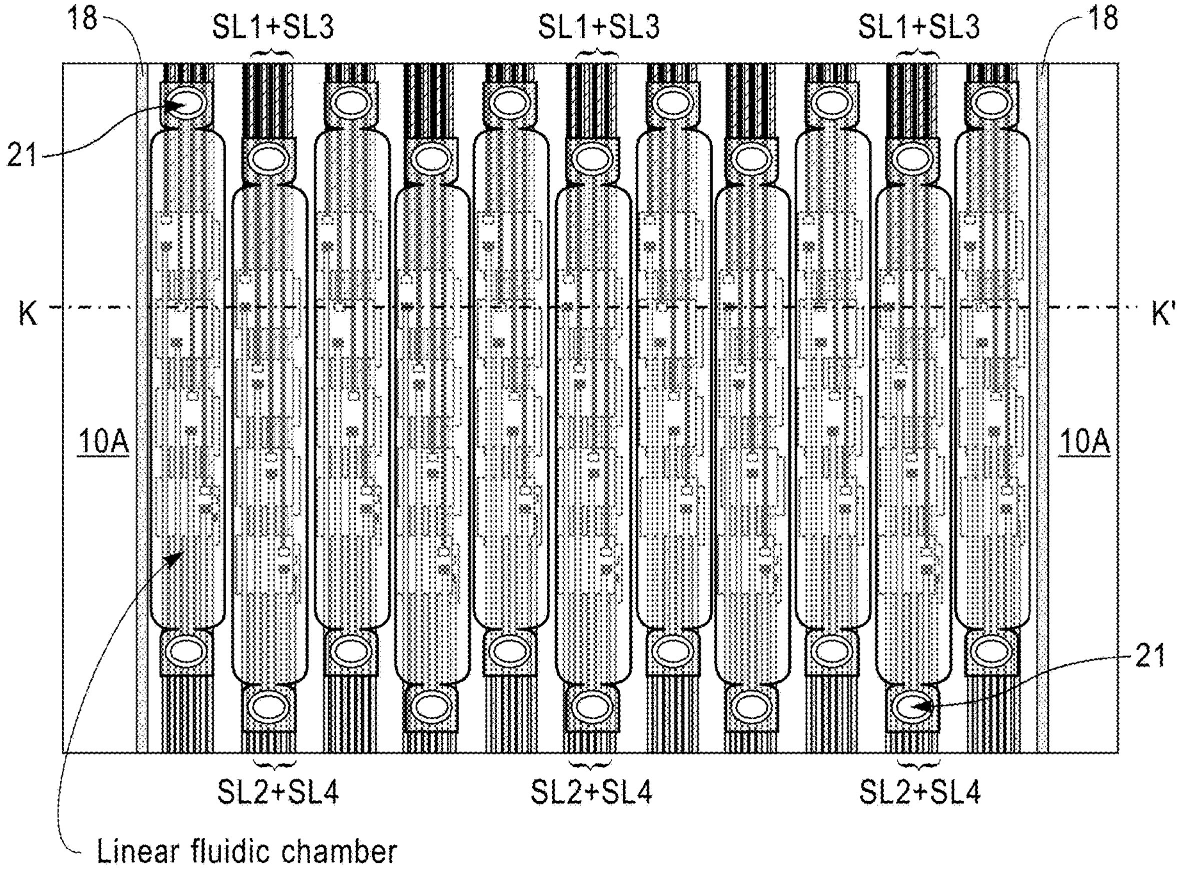
FIG. 8A is a top-down view illustrating a sensor array architecture after assembly of the first substrate and second substrate with a plurality of through holes, cut K-K' is shown.
Figure 8B:
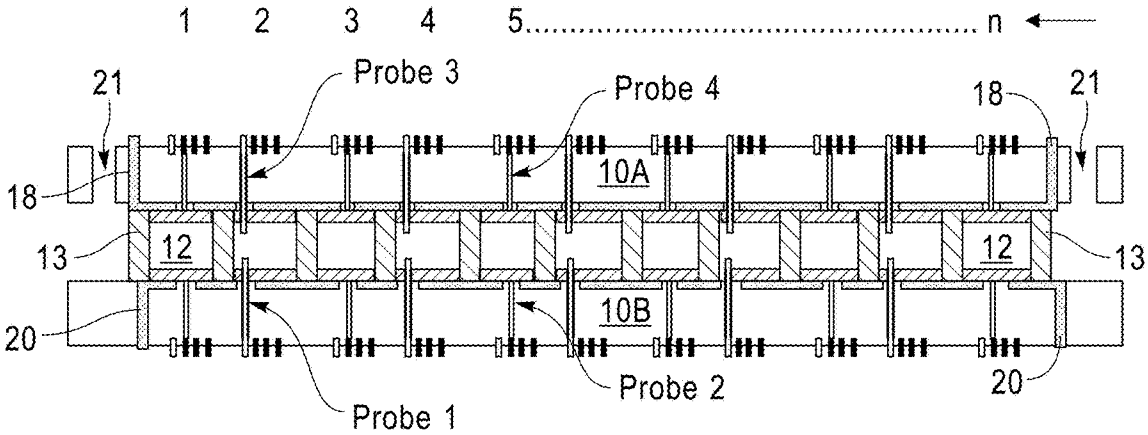
FIG. 8B is a cross sectional view through K-K' shown in FIG. 7A.

Referring now to FIG. 8A, there is illustrated a sensor array architecture after assembly of the first substrate 10A and second substrate 10B with a plurality of through holes 21, cut K-K' is shown. FIG. 8B shows the architecture through K-K' shown in FIG. 7A. Through holes 21 can be formed by lithography and etching. Some of the though holes 21 can be used in the present application to define an area in which a fluidic inlet port will be present, while other of the though holes 21 can be used in the present application to define an area in which a fluidic outlet port will be present. In the present application, the fluidic inlet port extends through the first substrate and is in fluidic communication with a first end of the microfluidic channel, and a fluidic exit port extends through the first substrate 10A and is in fluidic communication with a second end of the microfluidic channel.

Figure 9:
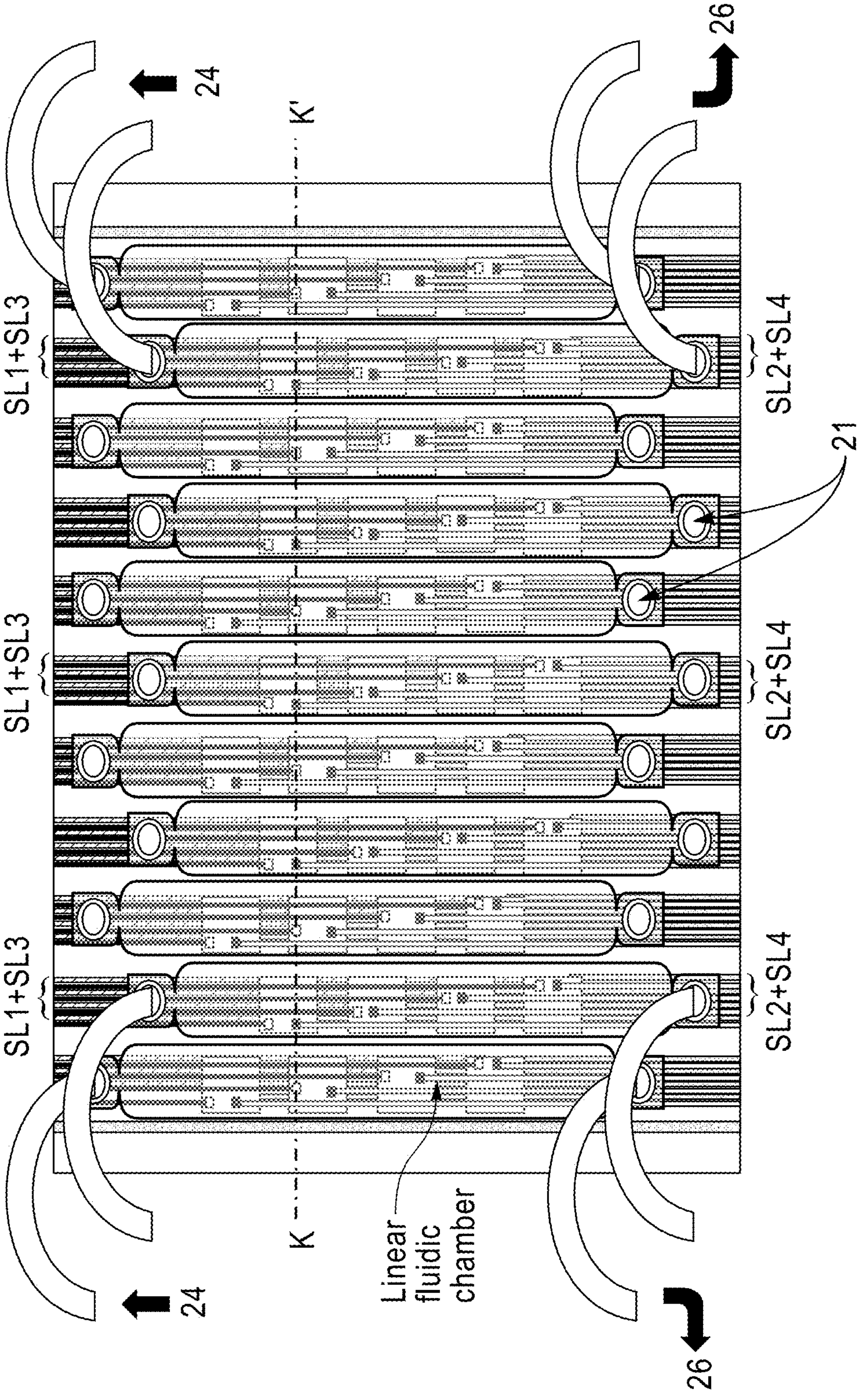
FIG. 9 is a top-down view illustrating a sensor array architecture after assembly of the first substrate and second substrate with a plurality of through holes, and a plurality of fluidic inlet and outlet ports.

Referring now to FIG. 9, there is illustrated a sensor array architecture after assembly of the first substrate 10A and second substrate 10B with a plurality of through holes 21, and a plurality of fluidic inlet ports 24 and fluidic outlet ports 26. The embodiment illustrated in FIG. 9 illustrates one means for introducing a liquid or gas into the linear microfluidic device of the present application. The plurality of fluidic inlet ports 24 can be merged, unmerged or a first set of fluidic inlet ports can be merged, and a second set of fluidic inlet ports can be unmerged. Also, and such an embodiment, the plurality of fluidic outlet ports can be merged, unmerged or a first set of fluidic outlet ports can be merged, and a second set of fluidic outlet ports can be unmerged. The fluidic outlet ports 26 can be connected to a vacuum to aid in removing the liquid or gas from the linear microfluidic device.

In the present application there are several arrangements possible for the fluidic inlet ports 24 and the fluidic outlet ports 26. In one example, each microfluidic channel is singular and is isolated from each other providing "n" isolated channels as is shown in FIG. 9. In another example, even microfluidic channels can be isolated but can be a calibration for differential measurement of an adjacent odd microfluidic channel. In yet another example, microfluidic channels can be used as redundancy so as to provide n/2 or less different assay conditions. In yet a further embodiment, any combination of the above disclosed arrangements can be implemented.

The one or more substances that can be sensed using the linear microfluidic device of the present application can be referred to as an analyte. As used herein, the term "analyte" or "analytes" is any biomolecule that can be recognized. In some embodiments, an analyte is a polypeptide. As used herein, a "polypeptide" is a single polymer chain of amino acids bonded together by peptide bonds between the carboxyl and amino groups of adjacent amino acid residues. The term "protein" includes polypeptide. The term "protein" may also be used to describe a polypeptide, having multiple domains, such as beta sheets, linkers and alpha-helices. As such, the term "protein" is also meant to include polypeptides having quaternary structures, ternary structures and other complex macromolecules composed of at least one polypeptide. If the protein is comprised of more than one polypeptide that physically associate with one another, then the term "protein" as used herein refers to the multiple polypeptides that are physically coupled and function together as the discrete unit.

In embodiments of the present application, an analyte is any polypeptide that includes an epitope or amino acid sequence of interest. Such polypeptide can be isolated from cells, synthetically produced, or recombinantly produced using means known by those of ordinary skill in the art. In some embodiments, an analyte is any polypeptide that includes an epitope or amino acid sequence of interest. In certain embodiments, polypeptide (protein) analytes can be isolated from cells or viruses, synthetically produced, or recombinantly produced. In one embodiment, an analyte is a protein or a fragment thereof that has been produced by a cell or virus. In certain embodiments, the analyte is a protein that is present on the outermost surface of the cellular membrane or viral capsid. In one embodiment, the protein present on the outermost surface of the cellular membrane or viral capsid has an antigen or epitope that is accessible to a label (e.g., antibody, dye). In yet other embodiments, an analyte is a protein or a fragment thereof that has been secreted by a cell.

In certain exemplary embodiments, an analyte is hemagglutinin present on a surface of an influenza virus, a derivative, analog or homolog thereof. In other exemplary embodiments, an analyte is a cell surface protein known by those of ordinary skill in the art. In other embodiments, the analyte is a nucleic acid. The nucleic acid analyte can be a deoxyribonucleic acid (DNA), e.g., genomic DNA or isolating coding DNA. In other embodiments, the nucleic acid analyte can be a ribonucleic acid (RNA), such as messenger RNA, ribosomal RNA molecule. The nucleic acid analyte can be single stranded or double stranded.

In certain embodiments, the analyte of interest can be affixed (bound) to a detectable label. The term "label" or "detectable label" as used herein means a molecule, such as a dye, nanoparticle, oligonucleotide, or an antibody that is capable of binding to an analyte of interest when contacted by the analyte. A label may be directly detectable (e.g., fluorescent moieties, electrochemical labels, electrochemical luminescence labels, metal chelates, colloidal metal particles, quantum dots), as well as a molecule or molecules that may be indirectly detected by production of a detectable reaction product (e.g., enzymes such as horseradish peroxidase, alkaline phosphatase and the like), a molecule or molecules that can be detected by recognition of a molecule that specifically binds to the detection antibody such as, a labeled antibody that binds to the detection antibody, biotin, digoxigenin, maltose, oligohistidine, 2,4-dinitrobenzene, phenylarsenate, a nucleic acid (e.g., ssDNA, dsDNA) or the like).

Labels for use in the present application can be provided on the surface of the probe electrodes that extend into the microfluidic channel or a label can be provided to a sample prior to introduction to a micro-capacitive sensor array of the present application. In certain embodiments, the label is affixed to the probe electrodes that extend into the microfluidic channel such that a binding portion (e.g., antigen-binding portion of an antibody) of the label is positioned such that the binding portion can be contacted by the portion of the analyte to which it binds (e.g., antigen) when presented thereto. In other instances, the probe electrodes that extend into the microfluidic channel can be coated with a label, which when contacted with an analyte removes the label from the structure.

A "sample" or a portion thereof is provided to linear microfluidic device of the present application; the sample can be a liquid, gas, emulsion, or gel. The sample contains at least one analyte (i.e. substance) of interest, such as a protein or nucleic acid. Regardless of the number of analytes or analytes of interest, the sample can be readily applied to a micro-capacitive sensor array of the present application. In certain embodiments, a sample may be obtained from a subject, or may be obtained from other materials. The term "subject" as used herein refers to a human or non-human organism. Further, while a subject is preferably a living organism, the subject can also be in post-mortem analysis as well. Subjects that are humans can be "patients," which as used herein refers to living humans that are receiving or may receive medical care for a disease or condition.

In some instances, the sample is created for the purpose of determining the presence of certain analytes therein. For example, a sample may be obtained from cell culture, a fluid or tissue known to include, or not include the analyte(s) of interest. In other instances, the sample is created by adding synthetic or recombinantly produced peptides to a solution that is easily stored and dispensed. In specific embodiments, samples for use in the present methods are body fluid samples obtained from a subject, such as a patient. In some embodiments, samples of the present disclosure include blood, tears serum, plasma, cerebrospinal fluid, urine, saliva, sputum, and pleural effusions. One of skill in the art would realize that certain samples would be more readily analyzed following processing, e.g., fractionation or purification. For example, fractionation of whole blood obtained from a subject into serum and/or plasma components. Hence, a sample can be used as is, or can be treated to result in a final sample for detection of analytes. For example, a sample can be liquefied, concentrated, dried, diluted, lyophilized, extracted, fractionated, subjected to chromatography, purified, acidified, reduced, degraded, subjected to enzymatic treatment, or otherwise treated in ways known to those having ordinary skill in the art in order to release an analyte of interest. If desired, a sample can be a combination (pool) of samples, e.g., from an individual or from a manufacturing process.

A sample can be in a variety of physical states, such as liquid, gas, emulsion, or gel. Samples can be treated with customary care to preserve analyte integrity. Treatment can include the use of appropriate buffers and/or inhibitors, such as inhibitors of certain biological enzymes. One having ordinary skill in the art will be able to determine the appropriate conditions given the analytes of interest and the nature of the sample.

For example, the sample can be liquid and the amount of a liquid sample provided to a microfluidic sensing cell of the present application can be from 1-100 mL, 1-50 mL, 1-40 mL, 1-30 mL, 1-20 mL, 1-10 mL, 1-5 mL, 1-4 mL, 1-3 mL, 1-2 mL or less than 2 mL of sample. In some embodiments, the amount of liquid sample is from 1-100 μL, 1-50 μL, 1-40 μL, 1-30 μL, 1-20 μL, 1-10 μL, 1-5 μL or less of sample.

In another aspect of the present application, a method for detecting the presence or absence of a biological cell is provided in which the linear microfluidic device is employed. The method considers the reactance (or capacitance) measurement of a pair of upper and lower probe electrodes arranged in 1D sequentially where the biological cells would pass through. The biological cells can be bacteria or virus. The biological cells can be plant or animal. A single pass ensures no misses or double counting. The reactance (or capacitance) is expected to change when a single biological cell or a cluster of biological cells pass through them.

In one embodiment, the method can include monitoring the reactance (or capacitance) measured across each pair of upper and lower probe electrodes in the absence of any biological cell or cluster of biological cells over a period of time. This provides a baseline for empty cell reactance (averaged over a time window, $Z_{base}(t)$; or $C_{bsae}(t)$. A first sample (fluid, gas, etc.) not containing the biological cell is then introduced into the microfluidic channel and that first sample is allowed to pass through the pair of upper and lower probe electrodes. During this stage, the reactance/capacitance is continuously measured. This provides a baseline for the first sample without the biological cell. A second sample (fluid, gas, etc.) containing the biological cell is then introduced into the microfluidic channel and that second sample is allowed to pass through the pair of upper and lower probe electrodes. Note that the fluid, gas, etc. that provides the second sample is the same as that which provides the first sample. During this stage, the reactance/capacitance is continuously measured. As the biological cell occupies a single pair of upper and lower probe electrodes, it will change the measured reactance or capacitance. This is expected to be a pulse-like change being caused in the dielectric constant as well as the conductance (i.e., impedance) of the medium occupied by a single cell band and its surrounding. This method is shown in FIG. 10.

Figure 10:
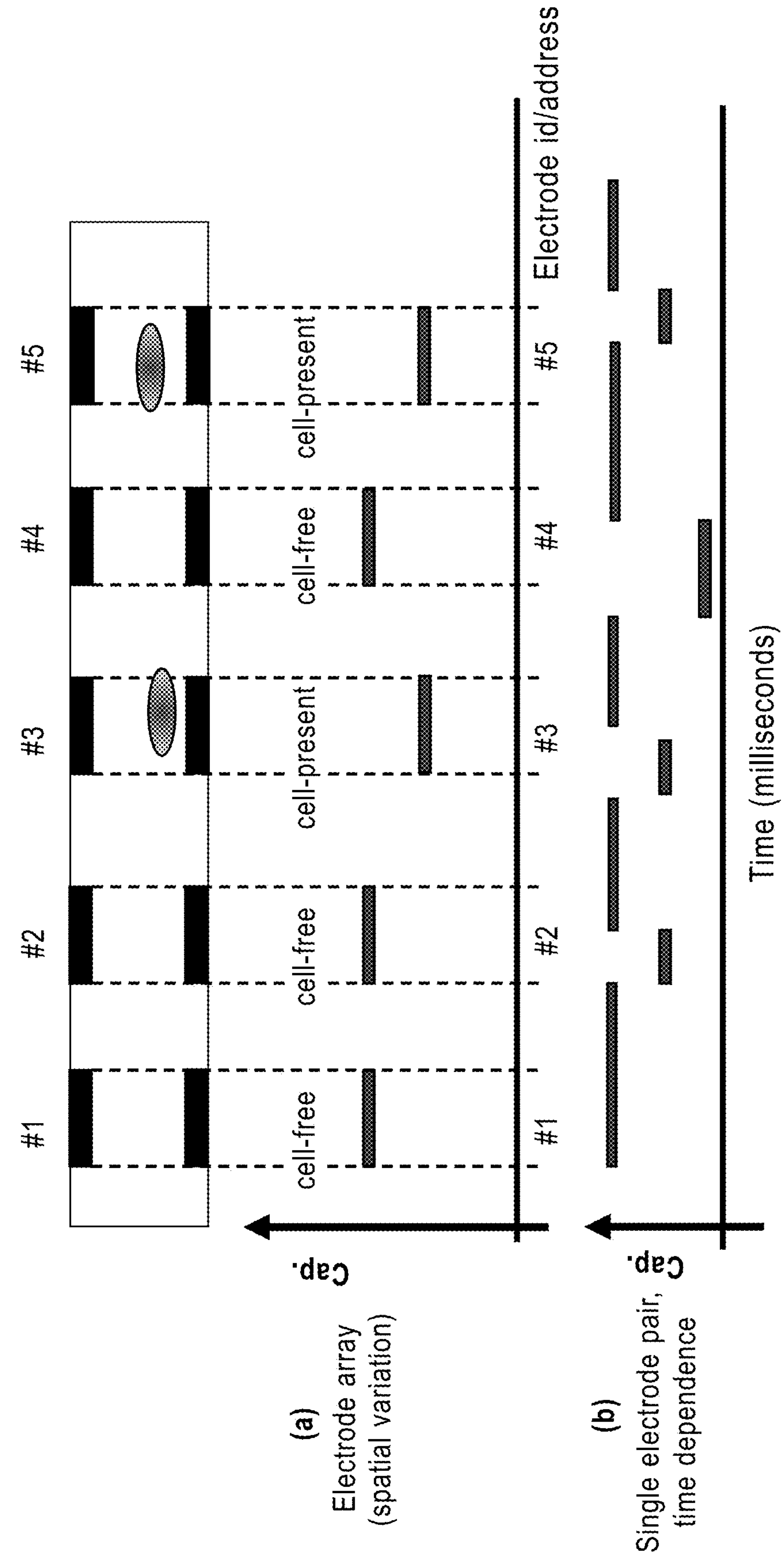
FIG. 10 is a graph illustrating a method for detecting the presence/absence of a cell (e.g., cell counting).

Notably, FIG. 10 shows the expected signal variation across (a) an electrode pair array and (b) a single electrode pair during a short span of time. In the first, second and fourth electrode pairs no biological cell is present (i.e., cell-free), while in third and fifth electrode pair, a biological cell is present. Similarly, when more than one biological cell occupies a single electrode pair during measurement, it is expected to show more decrease in the measured signal as in the third larger pulse in the signal variation measured by single electrode pair as in (b) of FIG. 10. These different types of signal variations observed for the absence of biological cells, presence of one, two, three or more biological cell as the case may be classified into different data classes and trained with DL neural network models. After training these models, when new signals measured over the same time span are passed through them, they will identify whether any biological cell was detected and how many of them were detected, also if no biological cell was detected, thus enabling the presence or absence of biological cells and how many of them passed through the electrode pair.

Figure 11:
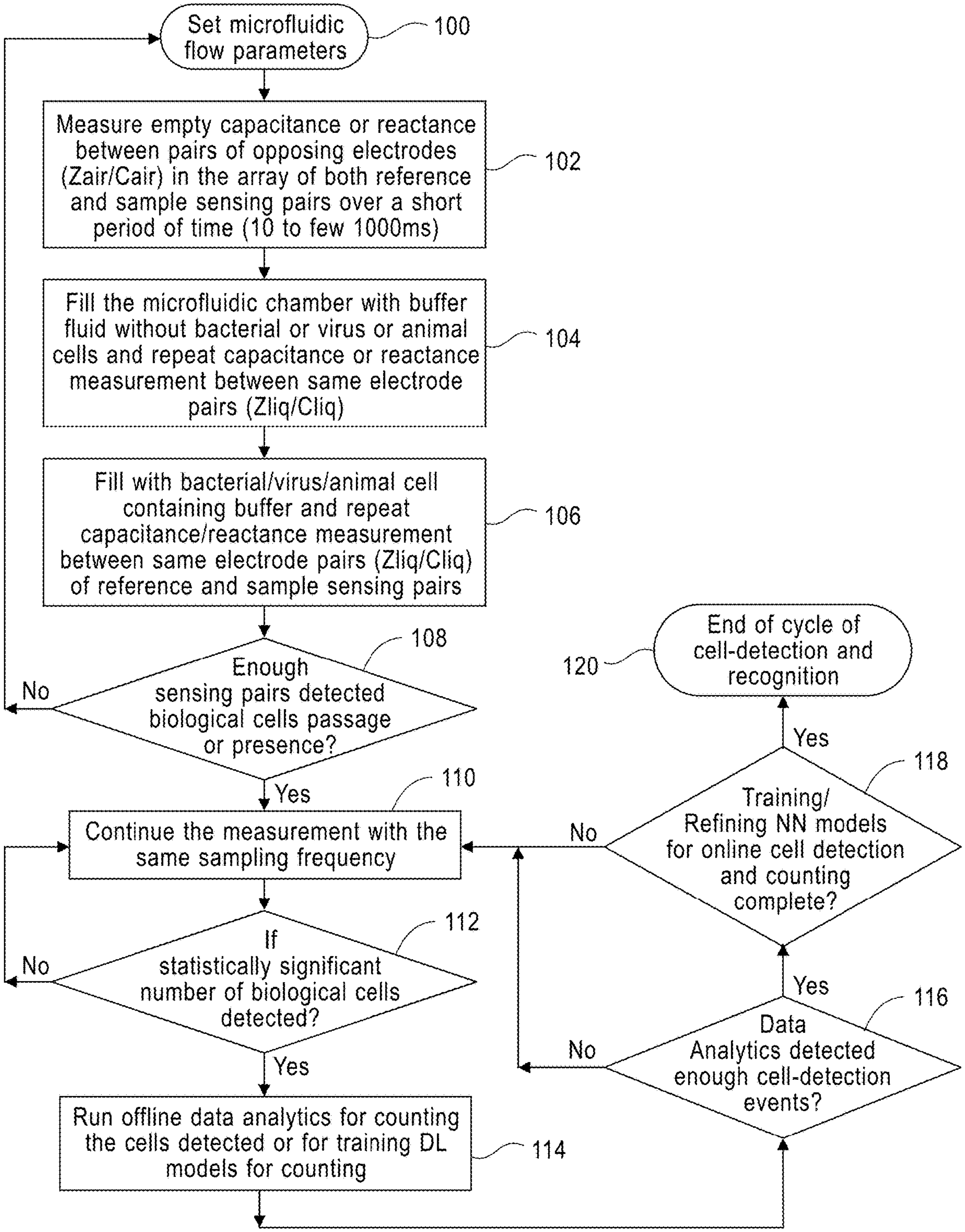
FIG. 11 is a flow diagram showing a method for counting biological cells (static or flow condition).

Referring now to FIG. 11, there is provided a flow diagram showing a method for counting biological cells (static or flow condition). The method can be implemented by a computer. The method starts by first setting the microfluidic flow parameters, step 100. Step 100 can include, for example, selecting a flow rate of a liquid or gas through a linear microfluidic device in accordance with the present application, and selecting a temperature of the liquid or gas inside the microfluidic channel. The flow rate and microfluidic channel temperature can vary and can be selected by one skilled in the art. Next, and as shown in step 102, the empty (in air and without the presence of any fluid or gas) capacitance, $C_{air}$, or reactance, $Z_{air}$, between pairs of opposing electrodes in the array of both reference electrode and sample sensing pairs of electrodes are measured over a short period of time, e.g., 10 ns to a few 1000 ns. After measuring $C_{air}$ or $Z_{air}$, the method continues at step 104 by filling the microfluidic chamber (i.e., channel) with a buffer fluid without bacterial or virus or animal cells and repeat the capacitance or reactance between same electrode pairs. Step 104 provides a base line measurement of $C_{liq}$ or $Z_{liq}$. In some cases, step 104 can use a gas instead and step 104 can be used to determine $C_{gas}$ or $Z_{gas}$. After performing the baseline measurements in step 104, the method continues at step 106 by introducing a buffer liquid/gas that contains bacterial/virus/animal cells into the microfluidic chamber (i.e., channel) and measuring the capacitance or reactance between same electrode pairs of reference and sample sensing pairs. With the data obtained in steps 102, 104 and 106, the method continues at step 108 in which a determination can be made whether or not enough sensing pairs detected biological cell passage or presence. If the determination is no, the method returns to step 100 and steps 102, 104, and 106 are repeated until the answer to step 108 is yes. In repeating steps 100, 102, 104, and 106 the sampling frequency can be reduced, and the dwell time can be increased in order to obtain a positive answer to step 108.

When the answer to yes is obtained in step 108, the method continues at step 110 by continuing the measurement with the same sampling frequency. After performing step 110, a determination can be made whether or not there is a statistically significant number of biological cells detected. See, step 112. If the answer is no, step 110 can be repeated until there is a statistically significant number of biological cells detected. When a statistically significant number of biological cells are detected, the method continues to step 114 in which includes running offline data analytics for counting the cells detected or for training DL models for counting is performed. The models will be trained with different classes of signals that correspond to either the absence or presence of biological cells between one electrode pair during measurement time. In the case of biological cells detected in the signal, it would also further identify how many of them were detected during measurement as outlined above in reference to (b) of FIG. 10. After performing step 114, a determination can made (see, step 116) whether or not the data analytics detected enough cell detection events. If the data analytics did not detect enough cell detection events, the method reverts to step 110 and steps 110, 112, and 114 can be repeated until the data analytics detect enough cell detection events. When the data analytics detect enough cell detection events, the method continues to step 118 in which a determination can be made whether or not the training/refining NN (Neural Network) models for online cell detection and counting are completed. The NN model training/refining can be inferred to be near completion from the behavior of the model training accuracy and loss curves during training/refining as the former would show near saturation to highest accuracy (close to 100%) with training cycle and the latter would level-off at some low value (much less than 1.0). If the determination is made in step 116 that the training/refining NN models for online cell detection and counting are incomplete, the method reverts to step 110 and steps 110, 112, and 114 can be repeated until there is a determination in step 118 that the training/refining NN models for online cell detection and counting are completed. When the training/refining NN models for online cell detection and counting are completed, the method ends with cell detection and recognition, see step 120.

Figure 12:
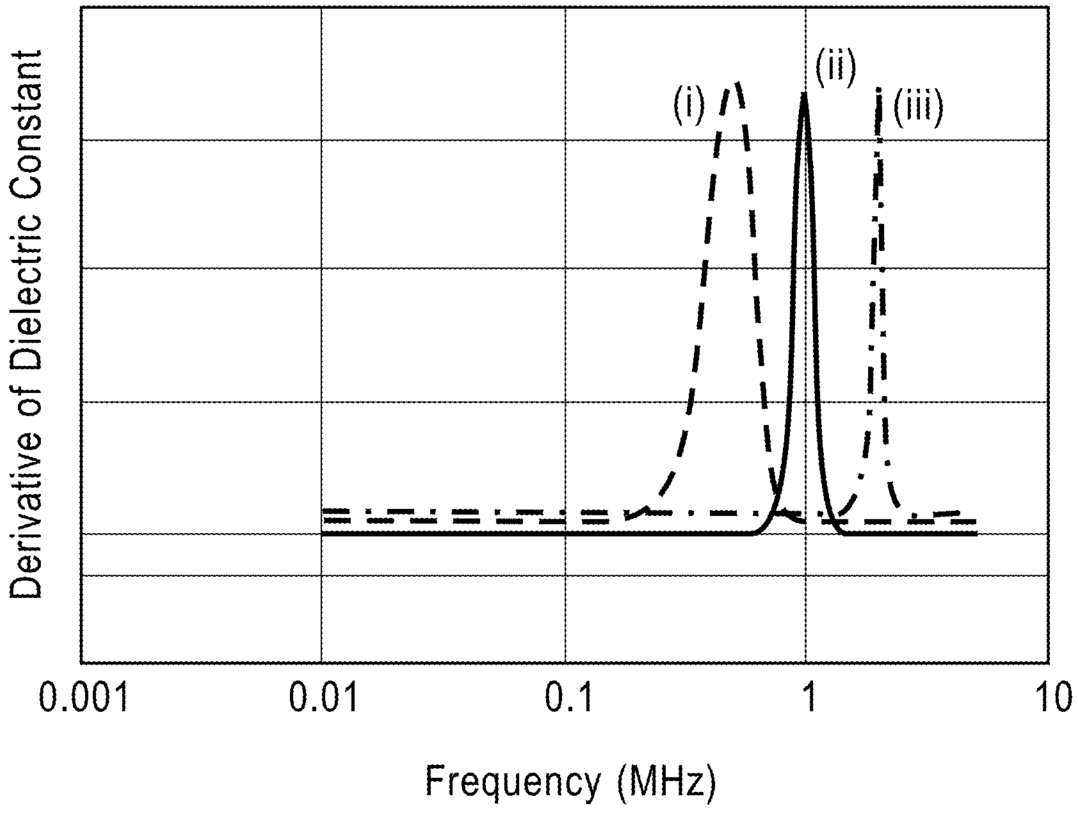
FIG. 12 is graph showing the expected dielectric behavior of different bacterial species.

In another embodiment, the linear microfluidic device of the present application can be used in a method for detecting the type of bacterial cells within a fluid/gas. Notably, the frequency response of the dielectric constant of bacterial suspensions show plateaus in different regions of the frequency (between 0.1 to 100 MHZ) that smoothly transition from one another. This behavior suggests that the derivative of them (See, FIG. 12, for example) would show peaks spanning these transition regions. Notably, FIG. 12 shows the expected dielectric behavior of different bacterial species in which the derivative of the dielectric constant vs frequency) MHz is plotted. Hence, one bacterial species can show one or more of such peaks depending on the number of plateaus observed. These peaks can be used to distinguish between different species of bacterial and also between viruses and bacteria. In FIG. 12, three derivative peaks (i), (ii) and (iii) are shown and those different peaks would correspond to different types of bacteria.

The method for detecting the type of bacterial cells within a fluid/gas can include a step of first introducing a fluid/gas containing no bacteria/virus/biological cell into the microfluidic channel of the linear microfluidic device of the present application and thereafter taking a background measurement, e.g., capacitance or reactance. The background measurement is taken over a wide range of frequencies (for example, between 0.1 to 100 MHZ) to extract the dielectric constant of the background medium. The method continues by introducing a fluid/gas containing a bacteria/virus/biological cell into the microfluidic channel of the linear microfluidic device of the present application and thereafter taking measurements of this medium over the same range of frequencies to obtain a dielectric constant over this frequency range. The derivative of the dielectric constant over this frequency range is then obtained and the different peaks (such as was shown in FIG. 12) would be used to determine the different types of bacteria/viruses/biological cells that are present. For calibrating the linear microfluidic device of the present application, dielectric dispersion measurements would be performed with only one type of bacteria/virus/biological cell present in the device. Neural network models can be trained with this data to identify the different bacteria/virus/biological cell that are present.

Figure 13:
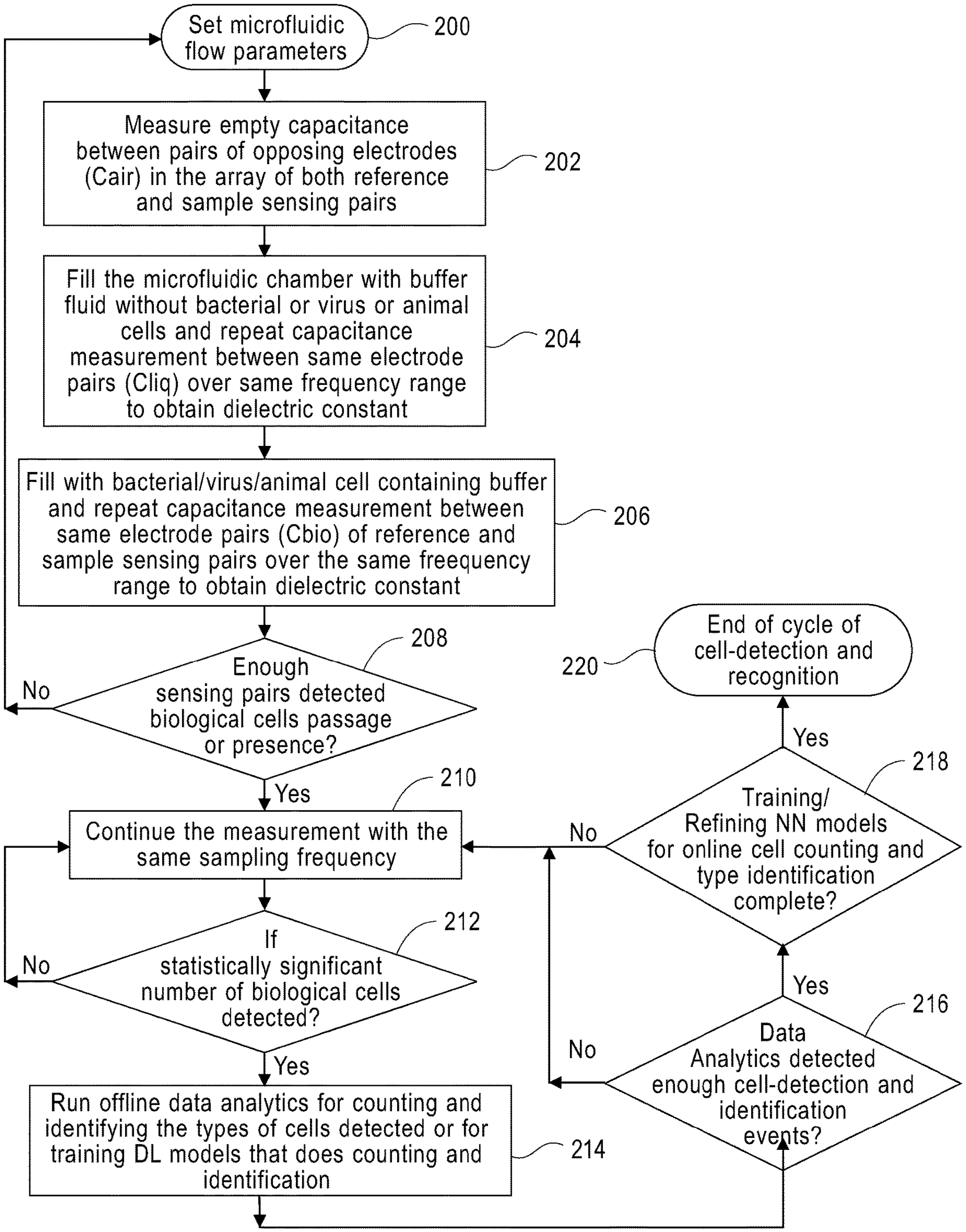
FIG. 13 is a flow diagram showing a method for the identifying biological cell types (static of flow condition).

Referring now FIG. 13, there is a flow diagram showing a method for the identifying biological cell types (static of flow condition). The method can be implemented by a computer. The method starts by first setting the microfluidic flow parameters, step 200. Step 200 can include, for example, selecting a flow rate of a liquid or gas through a linear microfluidic device in accordance with the present application, and selecting a temperature of the liquid or gas inside the microfluidic channel. The flow rate and microfluidic channel temperature can vary and can be selected by one skilled in the art. Next, and as shown in step 202, the empty (in air and without the presence of any fluid or gas) capacitance, $C_{air}$, between pairs of opposing electrodes in the array of both reference electrode and sample sensing pairs of electrodes are measured over a wide frequency range. Although $C_{air}$ is measured, $Z_{air}$ can be measured instead. In embodiments, $C_{gas}$ or $Z_{gas}$ can be measured instead. After measuring $C_{air}$, the method continues at step 204 by filling the microfluidic chamber (i.e., channel) with a buffer fluid (or buffer gas) without bacterial or virus or animal cells and repeat the capacitance (or reactance) between same electrode pairs and over the same frequency range to obtain a dielectric constant of the buffer fluid/gas. Step 204 provides a dielectric constant of the buffer fluid/gas. After determining the dielectric constant of the buffer liquid/gas in step 204, the method continues at step 206 by introducing a buffer liquid/gas that contains bacterial/virus/animal cells into the microfluidic chamber (i.e., channel) and measuring the capacitance (or reactance) between same electrode pairs of reference and sample sensing pairs and over the same frequency range to determine dielectric constants at the different frequencies. With the data obtained in steps 202, 204 and 206, the method continues at step 208 in which a determination can be made whether or not enough sensing pairs detected biological cell passage or presence. If the determination is no, the method returns to step 200 and steps 202, 204, and 206 are repeated until the answer to step 208 is yes. In repeating steps 200, 202, 204, and 206 the sampling frequency can be reduced, and the dwell time can be increased in order to obtain a positive answer to step 208.

When the answer to yes is obtained in step 208, the method continues at step 210 by continuing the measurement with the same sampling frequency. After performing step 210, a determination can be made whether or not there is a statistically significant number of biological cells detected. See, step 212. If the answer is no, step 210 can be repeated until there is a statistically significant number of biological cells detected. When a statistically significant number of biological cells are detected, the method continues to step 214 in which includes running offline data analytics for counting the cells detected or for training DL models for counting is performed. After performing step 214, a determination can made (see, step 216) whether or not the data analytics detected enough cell detection events. If the data analytics did not detect enough cell detection events, the method reverts to step 210 and steps 210, 212, and 214 can be repeated until the data analytics detect enough cell detection events. When the data analytics detect enough cell detection events, the method continues to step 218 in which a determination can be made whether or not the training/refining NN models for online cell detection and counting are completed. If the determination is made in step 216 that the training/refining NN models for online cell detection and counting are incomplete, the method reverts to step 210 and steps 210, 212, and 214 can be repeated until there is a determination in step 218 that the training/refining NN models for online cell detection and counting are completed. When the training/refining NN models for online cell detection and counting are completed, the method ends with cell detection and recognition, see step 220.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A linear microfluidic device comprising:

a first microfluidic channel extending linearly in a first direction and positioned between a first substrate and a second substrate;

at least one microfluidic sensing cell positioned along the first microfluidic channel, the at least one microfluidic sensing cell comprises an upper electrode portion comprising a first group of at least one upper electrically isolated probe electrode and a lower electrode portion comprising a second group of at least one lower electrically isolated probe electrode, wherein the at least one upper electrically isolated probe electrode of the first group has a vertical portion that extends entirely through the first substrate and the at least one lower electrically isolated probe electrode of the second group has a vertical portion that extends entirely through the second substrate;

a thermistor located on a surface of the first substrate that faces the first microfluidic channel, the thermistor comprises a vertical portion that extends through the entirety of the first substrate; and a resistive heating element located on a surface of the second substrate that faces the first microfluidic channel, the resistive heating element comprises a vertical portion that extends through the entirety of the second substrate.

2. The linear microfluidic device of claim 1, wherein the at least one upper electrically isolated probe electrode of the first group and the at least one lower electrically isolated probe electrode of the second group extend into the first microfluidic channel.

3. The linear microfluidic device of claim 1, wherein the at least one upper electrically isolated probe electrode of the first group is vertically aligned with the at least one lower electrically isolated probe electrode of the second group.

4. The linear microfluidic device of claim 1, wherein the at least one upper electrically isolated probe electrode of the first group is vertically offset from, yet overlapping with the at least second one electrically isolated probe electrode of the second group.

5. The linear microfluidic device of claim 1, further comprising a spacing element located between the first substrate and the second substrate.

6. The linear microfluidic device of claim 5, wherein the spacing element is present at each end of the first microfluidic channel.

7. The linear microfluidic device of claim 5, wherein a thickness of the spacing element determines a height of the first microfluidic channel.

8. The linear microfluidic device of claim 1, further comprising a first ground electrode electrically isolated from the at least one upper electrically isolated probe electrode of the first group, and a second ground electrode electrically isolated from the at least one lower electrically isolated probe electrode of the second group.

9. The linear microfluidic device of claim 8, wherein the at least one upper electrically isolated probe electrode of the first group is coaxial with the first ground electrode, and the at least one lower electrically isolated probe electrode of the second group is coaxial with the second ground electrode.

10. The linear microfluidic device of claim 1, wherein the at least one microfluidic sensing cell comprises a plurality of microfluidic sensing cells that are spaced apart from each other and positioned along the first microfluidic channel.

11. The linear microfluidic device of claim 1, further comprising a fluidic inlet port extending through the first substrate and in fluidic communication with a first end of the first microfluidic channel, and a fluidic exit port extending through the first substrate and in fluidic communication with a second end of the first microfluidic channel.

12. The linear microfluidic device of claim 1, wherein the at least one upper electrically isolated probe electrode of the first group and the at least one least one lower electrically isolated probe electrode of the second group are configured for capacitance sensing of a substance of interest that passes through the first microfluidic channel.

13. The linear microfluidic device of claim 1, further comprising:

at least one other microfluidic channel located adjacent to and spaced apart from the first microfluidic channel, wherein the at least one other microfluidic channel extends linearly in the first direction and is positioned between the first substrate and the second substrate; and at least one other microfluidic sensing cell positioned along the at least one other microfluidic channel, the at least one other microfluidic sensing cell comprises an upper electrode portion comprising another first group of the at least one upper electrically isolated probe electrode and a lower electrode portion comprising another second group of the at least one lower electrically isolated probe electrode, wherein the at least one upper electrically isolated probe electrode of the another first group has a vertical portion that extends entirely through the first substrate and the at least one lower electrically isolated probe electrode of the another second group has a vertical portion that extends entirely through the second substrate.

14. The linear microfluidic device of claim 13, wherein the at least one upper electrically isolated probe electrode of the another first group and the at least one lower electrically isolated probe electrode of the another second group extend into the at least one other microfluidic channel.

15. A method of detecting the presence or absence of biological cells, the method comprising:

providing a linear microfluidic device comprising a first microfluidic channel extending linearly in a first direction and positioned between a first substrate and a second substrate, and at least one microfluidic sensing cell positioned along the first microfluidic channel, the at least one microfluidic sensing cell comprises an upper electrode portion comprising a first group of at least one upper electrically isolated probe electrode and a lower electrode portion comprising a second group of at least one lower electrically isolated probe electrode, wherein the at least one upper electrically isolated probe electrode of the first group has a vertical portion that extends entirely through the first substrate and the at least one lower electrically isolated probe electrode of the second group has a vertical portion that extends entirely through the second substrate;

determining a first sample baseline by introducing a first sample not containing a biological cell into the first microfluidic channel and by measuring a reactance or a capacitance of the first sample between the upper electrode portion and the lower electrode portion;

determining a second sample baseline by introducing a second sample containing a biological cell into the microfluidic channel and continuously measuring the reactance or capacitance of the second sample containing the biological cell between the upper electrode portion and the lower electrode portion; and comparing the second sample baseline with the first sample baseline in which no change in the second sample baseline compared to the first sample base line signifies absence of a biological cell, and in which a change in the second sample baseline compared to the first sample baseline signifies the presence of a biological cell.

16. A method of detecting biological cell type, the method comprising:

providing a linear microfluidic device comprising a first microfluidic channel extending linearly in a first direction and positioned between a first substrate and a second substrate, and at least one microfluidic sensing cell positioned along the first microfluidic channel, the at least one microfluidic sensing cell comprises an upper electrode portion comprising a first group of at least one upper electrically isolated probe electrode and a lower electrode portion comprising a second group of at least one lower electrically isolated probe electrode, wherein the at least one upper electrically isolated probe electrode of the first group has a vertical portion that extends entirely through the first substrate and the at least one lower electrically isolated probe electrode of the second group has a vertical portion that extends entirely through the second substrate;

measuring a reactance or a capacitance of a first sample not containing a biological cell between the upper electrode portion and the lower electrode portion and over a selected frequency range to determine a dielectric constant of a medium not containing the biological cell over the selected frequency range;

introducing a second sample containing a biological cell into the microfluidic channel and continuously measuring the reactance or capacitance of the second sample containing the biological cell between the upper electrode portion and the lower electrode portion to determine a dielectric constant of the second sample containing the biological cell over the selected frequency range;

calculating a derivative of the dielectric constant of both the first sample and the second sample;

plotting the derivative of the dielectric constant of both the first sample and the second sample on a graph to show a peak of each derivative wherein matching peaks represent a same biological cell type and non matching peaks represent different biological cell types.

* * * * *